US007069723B2

(12) United States Patent
Yamamoto et al.

(10) Patent No.: US 7,069,723 B2

(45) Date of Patent: Jul. 4, 2006

(54) ANTI-REACTION VALVE DEVICE, AND CONTROL UNIT AND HYDRAULICALLY POWERED SYSTEM COMPRISING ANTI-REACTION VALVE DEVICE

(75) Inventors: Ryo Yamamoto, Hyogo (JP); Masahiro Matsuo, Hyogo (JP)

(73) Assignee: Kabushiki Kaisha Kawasaki Precision Machinery, Hyogo (JP)

( * ) Notice: Subject to any disclaimer, the term of this patent is extended or adjusted under 35 U.S.C. 154(b) by 58 days.

(21) Appl. No.: 10/979,889

(22) Filed: Nov. 2, 2004

(65) Prior Publication Data

US 2005/0126166 A1 Jun. 16, 2005

(30) Foreign Application Priority Data

Nov. 12, 2003 (JP) ............................ 2003-382437

(51) Int. Cl.
*F16D 31/02* (2006.01)

(52) U.S. Cl. .......................................... 60/468; 60/469

(58) Field of Classification Search .................. 60/468, 60/469; 91/433, 437; 137/512.3

See application file for complete search history.

(56) References Cited

U.S. PATENT DOCUMENTS 4,628,690 A * 12/1986 Arai et al. .................... 60/464
5,048,296 A * 9/1991 Sunamura et al. ............ 60/468
6,868,672 B1 * 3/2005 Luo ........................... 60/468
6,959,726 B1 * 11/2005 Jervis et al. ............ 137/512.1

FOREIGN PATENT DOCUMENTS

| | | |
|---|---|---|
| EP | 0 378 129 A1 | 7/1990 |
| JP | 07-133803 | 5/1995 |
| JP | 3164469 | 3/2001 |

OTHER PUBLICATIONS

European Search Report for European Application No. EP 04 25 6735 by the European Patent Office (Munich) dated Jun. 8, 2005, 3 pages.

* cited by examiner

*Primary Examiner*—Igor Kershteyn
(74) *Attorney, Agent, or Firm*—Marshall, Gerstein & Borun LLP

(57) ABSTRACT

An anti-reaction valve device is configured to open such that a plunger and a sheet member move away from each other in association with first and second set difference pressures. Two anti-reaction valve devices are provided between two pipes fluidically connected to a hydraulically powered actuator such that directional relationship of connection of primary and secondary ports is reversed between the two anti-reaction valve devices so that a reaction of the actuator is inhibited quickly and reliably. A one-way valve is positioned between the secondary port and an open and close control chamber within which the plunger and the sheet member are movable into contact with and away from each other and serves to inhibit a back flow of a hydraulic fluid. The one-way valve is capable of inhibiting the plunger and the sheet member from moving away from each other undesirably, and hence malfunction of the anti-reaction valve devices.

6 Claims, 13 Drawing Sheets

ANTI-REACTION VALVE DEVICE, AND CONTROL UNIT AND HYDRAULICALLY POWERED SYSTEM COMPRISING ANTI-REACTION VALVE DEVICE

BACKGROUND OF THE INVENTION

1. Field of the Invention

The present invention relates to an anti-reaction valve device capable of inhibiting a reaction of a hydraulically powered actuator configured to drive an element, and a control unit and a hydraulically powered system comprising the anti-reaction valve device.

2. Description of the Related Art

FIG. 12 is a cross-sectional view showing the conventional anti-reaction device 1 disclosed in, for example, Japanese Patent No. 3164469. FIG. 13 is a view showing a hydraulically powered system 3 comprising anti-reaction valve devices 1 and 2. As used herein, the term "rotation" means an angular displacement with an angle less than 360 degrees. The hydraulically powered system 3 is configured to cause, for example, a turn table of a construction machine to be driven to rotate. The hydraulically powered system 3 is equipped with a hydraulically powered motor 4 connected to the turn table (not shown). Pipes 7 and 8 are connected to inlet and outlet ports 5 and 6 of the hydraulically powered motor 4, respectively. Hydraulic oil is supplied to the hydraulically powered motor 4 by a hydraulic pump 10 through the pipe 7 or the pipe 8 via a directional control valve 9 to cause the hydraulically powered motor 4 to rotate, thereby causing the turn table to be driven to rotate.

When the hydraulically powered motor 4 stops driving the turn table, it tends to react. If supply of the hydraulic oil is stopped to cause the hydraulically powered motor 4 to stop driving the turn table in the state in which the hydraulically powered motor 4 is driving the turn table, then the hydraulically powered motor 4 tends to continue rotation due to inertia. As a result, a pressure of the hydraulic oil on the supply side becomes lower than the pressure of the hydraulic oil under the state in which the motor 4 is driving, and a pressure of the hydraulic oil on the return side becomes higher than the pressure of the hydraulic fluid under the state in which the hydraulically powered motor 4 is driving. This causes the hydraulically powered motor 4 to rotate in an opposite direction to the rotation to drive the turn table. The hydraulically powered motor 4 counterrotates repeatedly, which phenomenon is called the reaction.

In order to inhibit such a reaction, the hydraulically powered system 3 is equipped with two anti-reaction valve devices 1 and 2 between the pipes 7 and 8 such that directional relationship of connection of primary ports 11 and secondary ports 12 between the pipes 7 and 8 may be reversed between the anti-reaction valve devices 1 and 2, i.e., the hydraulic oil flows within the primary ports 11 in a reverse direction and flows within the secondary ports 12 in a reverse direction between the anti-reaction valve devices 1 and 2. The anti-reaction valve devices 1 and 2 have the same construction, and therefore, a schematic construction of the anti-reaction valve device 1 will be described with reference to FIG. 12.

Referring to FIG. 12, the anti-reaction valve device 1 comprises a casing 13 having the primary port 11 and the secondary port 12, a plunger 15 having a cylinder bore 14, a sheet member 16, a piston 17 slidably fitted in the cylinder bore 14, a first spring 18 configured to press the plunger 15 in the opposite direction to the sheet member 16, and a second spring 19 configured to press the sheet member 16 toward the plunger 15. The casing 13 has a plunger storage bore 20 and a sheet member storage bore 21, and has a valve chamber 24 at an intermediate portion of the plunger storage bore 20 and the sheet member storage bore 21 with the valve chamber 24 interposed between land portions 22 and 23. The plunger 15 and the sheet member 16 are sidably fitted to the land portions 22 and 23 and are configured to move into contact with or away from each other within the valve chamber 24.

The plunger 15 is provided with a small bore 25 extending in an axial direction of the plunger 15 and configured to open in the cylinder bore 14. The sheet member 16 is provided with an inner bore 26 extending in an axial direction of the sheet member 16 and configured to open in the primary port 11. Within the sheet member storage bore 21, a damping pressure chamber 28 is formed to communicate with the primary port 11 through an orifice 27, and the plunger storage bore 20 communicates with the secondary port 12.

Spring forces (loads) of the first and second springs 18 and 19 are set so that when a primary pressure of the hydraulic oil on the primary port 11 side is higher than a secondary pressure of the hydraulic oil on the secondary port 12 side, and a difference pressure obtained by subtracting the secondary pressure from the primary pressure rapidly decreases from not less than a first set pressure value to less than the first set pressure value, the plunger 15 and the sheet member 16 move away from each other, while when the secondary pressure is higher than the primary pressure, and a difference pressure obtained by subtracting the primary pressure from the secondary pressure rapidly decreases from not less than a second set pressure value to less than the second set pressure value, the plunger 15 and the sheet member 16 move away from each other. And, a steel ball 29 is provided between the plunger 15 and the sheet member 16 and configured to close the inner bore 26 when the secondary pressure is higher than the primary pressure.

The anti-reaction valve devices 1 and 2 thus constructed allow the hydraulic oil to move between the pipes 7 and 8 to inhibit counterrotation of the hydraulically powered motor 4, when the hydraulically powered motor 4 stops driving. This makes it possible to inhibit the reaction of the hydraulically powered motor 4.

As described above, in the conventional anti-reaction valve devices 1 and 2, the steel ball 29 is provided between the plunger 15 and the sheet member 16 to close the inner bore 26 when the secondary pressure is higher than the primary pressure. In the anti-reaction valve device 1 having a structure for inhibiting flow of the hydraulic oil from the secondary port 12 to the primary port 11 by using the steel ball 29 interposed between the plunger 15 and the sheet member 16, if the hydraulic oil in the secondary port 12 leaks into a gap between the plunger 15 and the sheet member 16 directly or through a gap between the plunger 15 and the piston 17 under the condition in which the secondary pressure is higher than the primary pressure, the sheet member 16 and the steel ball 29 are pushed to be moved together away from the plunger 15, so that the plunger 15 and the sheet member 16 become distant from each other. If such an event takes place, the anti-reaction valve devices 1 and 2 may malfunction, i.e., open when the these devices 1 and 2 should not open to inhibit the reaction.

SUMMARY OF THE INVENTION

The present invention has been developed under the circumstances, and an object of the present invention is to provide an anti-reaction valve device capable of inhibiting malfunction, and a control unit and a hydraulically powered system comprising the anti-reaction valve device.

According to one aspect of the present invention, there is provided an anti-reaction valve device comprising a casing provided with a primary port and a secondary port and a valve passage through which the primary and secondary ports to fluidically communicate with each other; a plunger sidably provided in the casing; a sheet member slidably provided in the casing, the sheet member being movable to contact with the plunger to close the valve passage and being movable away from the plunger to open the valve passage; a spring drive means configured to drive the plunger and the sheet member by exerting a spring force to the plunger and the sheet member in such a manner that, the plunger and the sheet member move away from each other, when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and an open and close control chamber, and configured to inhibit a flow of the hydraulic fluid from the secondary port to the open and close control chamber.

In accordance with the present invention, when the primary pressure is higher than the secondary pressure, and the first difference pressure obtained by subtracting the secondary pressure from the primary pressure decreases from not lower than the first predetermined set difference pressure to not higher than the first open start difference pressure at the speed not lower than the first predetermined reduction speed, the plunger and the sheet member move away from each other. Thereby, the anti-reaction valve device opens, and the hydraulic fluid flows from the primary port to the secondary port. And, when the secondary pressure is higher than the primary pressure, and the second difference pressure obtained by subtracting the primary pressure from the secondary pressure decreases from not lower than the second predetermined set difference pressure to not higher than the second open start difference pressure at the speed not lower than the second reduction speed, the plunger and the sheet member move away from each other. In this state, since the secondary pressure is higher than the primary pressure, the one-way valve means inhibits the flow of the hydraulic fluid from the secondary port to the open and close control chamber, and the anti-reaction valve device is closed. When the primary pressure becomes higher than the secondary pressure in this state, the anti-reaction valve device opens, and the hydraulic fluid flows from the primary port to the secondary port. As defined herein, the second set difference pressure is lower than the first set difference pressure.

A set of two-anti-reaction valve devices constructed as described above are provided between the two input and output pipes connected to the hydraulically powered actuator in such a manner that directional relationship of connection of the primary port and the secondary port between the two input and output pipes may be reversed between the two anti-reaction valve devices. Thereby, it is possible to inhibit the reaction occurring when the hydraulically powered actuator is stopped. Without the anti-reaction valve devices, the hydraulically powered actuator tends to rotate due to inertia when the actuator is stopped, and causes the difference pressure between the input and output pipes. As a result, the actuator rotates in the opposite direction (counterrotates). In the construction in which the anti-reaction valve devices are equipped, by moving the hydraulic fluid between the input and output pipes when the difference pressure is generated, the counterrotation of the hydraulically powered actuator, and hence the reaction are inhibited. The anti-reaction valve device is configured to open in association with the first and second set difference pressures, and is capable of inhibiting first counterrotation and subsequent counterrotation of the hydraulically powered actuator. It is thus possible to inhibit the reaction of the hydraulically powered actuator quickly and reliably.

Also, in a case where the hydraulically powered actuator is operated for a short time and then stopped, the plunger and the sheet member are kept distant from each other in association with the second set difference pressure in the first counterrotation, and the subsequent counter rotation is inhibited. In this manner, the reaction is inhibited.

The one-way valve means configured to open in association with the first and second set difference pressures is positioned between the secondary port and the open and close control chamber within which the plunger and the sheet member are movable into contact with and away from each other. The one-way valve means serves to inhibit confinement of a fluid leaking into a gap between the plunger and the sheet member through a clearance between components, for example, a clearance between the casing and the plunger, thus inhibiting the sheet member and the plunger from moving away from each other undesirably. Thus, malfunction caused by such leakage of the fluid can be inhibited.

According another aspect of the present invention, there is provided an anti-reaction valve device comprising a casing provided with a primary port and a secondary port, and having two land portions which separates an interior of the casing to define a plunger chamber fluidically connected to the secondary port, a sheet member chamber fluidically connected to the primary port, and an open and close control chamber disposed between the plunger chamber and the sheet member chamber and configured to be fluidically connected to the secondary port; a plunger fitted in the plunger chamber, and having one end portion slidably fitted to one of the two land portions which defines the plunger chamber and the open and close chamber so as to protrude into the open and close control chamber, the plunger having a cylinder bore which opens in the plunger chamber, and a plunger inner bore which opens in the cylinder bore; a sheet member fitted in the sheet member chamber and slidably mounted on an inner surface portion of a portion of the casing which faces the sheet member chamber, the sheet member separating the sheet member chamber to define a port space fluidically connected to the primary port and a damping space fluidically connected to the primary port through a restricting hole, the sheet member having one end portion sidably fitted to an opposite land portion of the two land portions which defines the sheet member chamber and the open and close control chamber so as to protrude into the open and close control chamber, the sheet member having a valve bore which opens in the sheet member chamber, the sheet member being movable to contact with the plunger within the open and close control chamber to allow the valve bore and the plunger inner bore to be connected to each other to be fluidically disconnected from the open and close control chamber and being movable away from the plunger within the open and close control chamber to allow the valve bore and the plunger inner bore to be away from each other to be fluidically connected to the open and close control chamber; a piston sidably fitted in the cylinder bore such that one end portion thereof protrudes into the cylinder bore; and a spring drive means having a first spring member configured to exert a spring force to the plunger to cause the plunger to move away from the sheet member and a second spring member configured to exert a spring force to the sheet member to cause the sheet member to move close to the plunger, the spring drive means being configured to drive the plunger and the sheet member in such a manner that, the plunger and the sheet member move away from each other, when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and the open and close control chamber, and configured to inhibit a flow of the hydraulic fluid from the secondary port to the open and close control chamber.

In accordance with the present invention, when the primary pressure is higher than the secondary pressure, and the first difference pressure obtained by subtracting the secondary pressure from the primary pressure decreases from not lower than the first set difference pressure to not higher than the first open start difference pressure at the speed not lower than the first predetermined reduction speed, the plunger and the sheet member move away from each other. Thereby, the anti-reaction valve device opens, and the hydraulic fluid flows from the primary port to the secondary port. And, when the secondary pressure is higher than the primary pressure, and the second difference pressure obtained by subtracting the primary pressure from the secondary pressure decreases from not lower than the second set difference pressure to not higher than the second open start difference pressure at the speed not lower than the second predetermined reduction speed, the plunger and the sheet member move away from each other. In this state, since the secondary pressure is higher than the primary pressure, the one-way valve means inhibits the flow of the hydraulic fluid from the secondary port to the open and close control chamber, and the anti-reaction valve device is closed. When the primary pressure becomes higher than the secondary pressure in this state, the anti-reaction valve device opens, and the hydraulic fluid flows from the primary port to the secondary port. As defined herein, the second set difference pressure is lower than the first set difference pressure.

A set of two-anti-reaction valve devices constructed as described above are provided between the two input and output pipes connected to the hydraulically powered actuator in such a manner that directional relationship of connection of the primary port and the secondary port between the two input and output pipes may be reversed between the two anti-reaction valve devices. Thereby, it is possible to inhibit the reaction occurring when the operation of the hydraulically powered actuator is stopped. Without the anti-reaction valve devices, the hydraulically powered actuator tends to rotate due to inertia when the actuator is stopped, and causes the difference pressure between the input and output pipes. As a result, hydraulically powered actuator rotates in the opposite direction (counterrotates). In the construction in which the anti-reaction valve devices are equipped, by moving the hydraulic fluid between the input and output pipes when the difference pressure is generated, the counterrotation of hydraulically powered actuator, and hence the reaction are inhibited. The anti-reaction valve device is configured to open in association with the first and second set difference pressures, and is capable of inhibiting first counterrotation and subsequent counterrotation of the hydraulically powered actuator. It is thus possible to inhibit the reaction of the hydraulically powered actuator quickly and reliably.

Also, in a case where the actuator is operated for a short time and then stopped, the plunger and the sheet member are kept distant from each other in association with the second set difference pressure in the first counterrotation, and the subsequent counter rotation is inhibited. Thereby, the reaction is inhibited.

The one-way valve means configured to open in association with the first and second set difference pressures is positioned between the secondary port and the open and close control chamber within which the plunger and the sheet member are movable into contact with and away from each other. The one-way valve means serves to inhibit confinement of a fluid leaking into a gap between the plunger and the sheet member through a clearance between components, for example, a clearance between the casing and the plunger, and to release the fluid to the primary port, thus inhibiting the sheet member and the plunger from moving away from each other undesirably. Thus, malfunction caused by such leakage of the fluid can be inhibited.

According to another aspect of the present invention, there is provided a control valve unit equipped in a hydraulically powered system including a hydraulically powered actuator having inlet and outlet ports; a supply means configured to supply a hydraulic fluid to the hydraulically powered actuator; and two input and output pipes configured to fluidically connect the inlet and outlet ports of the hydraulically powered actuator to the supply means, the control valve unit comprising the above-stated two anti-reaction valve, wherein directional relationship of connection of the primary port and the secondary port between the input and output pipes is reversed between the anti-reaction valve devices.

In accordance with the present invention, it is possible to achieve the control valve unit capable of properly controlling the hydraulically powered actuator so that the reaction of the actuator can be inhibited.

According to another aspect of the present invention, there is provided a hydraulically powered system comprising a hydraulically powered actuator provided with two inlet and outlet ports; a supply means configured to supply a hydraulic fluid to the hydraulically powered actuator; two input and output pipes configured to fluidically connect the inlet and outlet ports of the hydraulically powered actuator to the supply means; and above-stated two anti-reaction valve devices anti-reaction valve devices, wherein directional relationship of connection of the primary port and the secondary port between the input and output pipes is reversed between the anti-reaction valve devices.

In accordance with the present invention, it is possible to achieve the hydraulically powered system capable of properly controlling the hydraulically powered actuator so that the reaction of the actuator can be inhibited.

The above and further objects and features of the invention will more fully be apparent from the following detailed description with accompanying drawings.

DETAILED DESCRIPTION OF THE PREFERRED EMBODIMENTS

Figure 1:
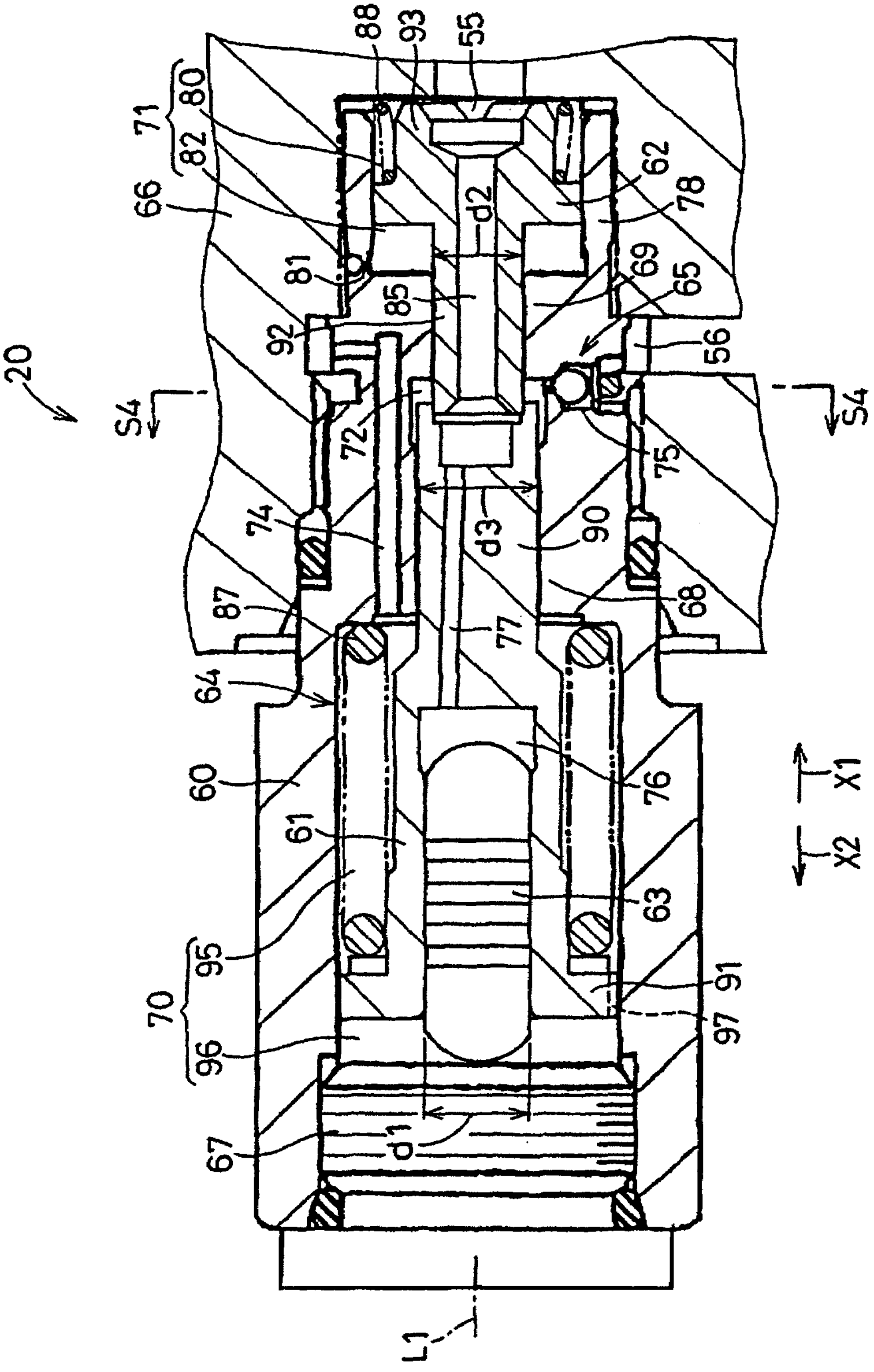
FIG. 1 is a cross-sectional view of an anti-reaction valve device in a first standby state according to an embodiment of the present invention.
Figure 2:
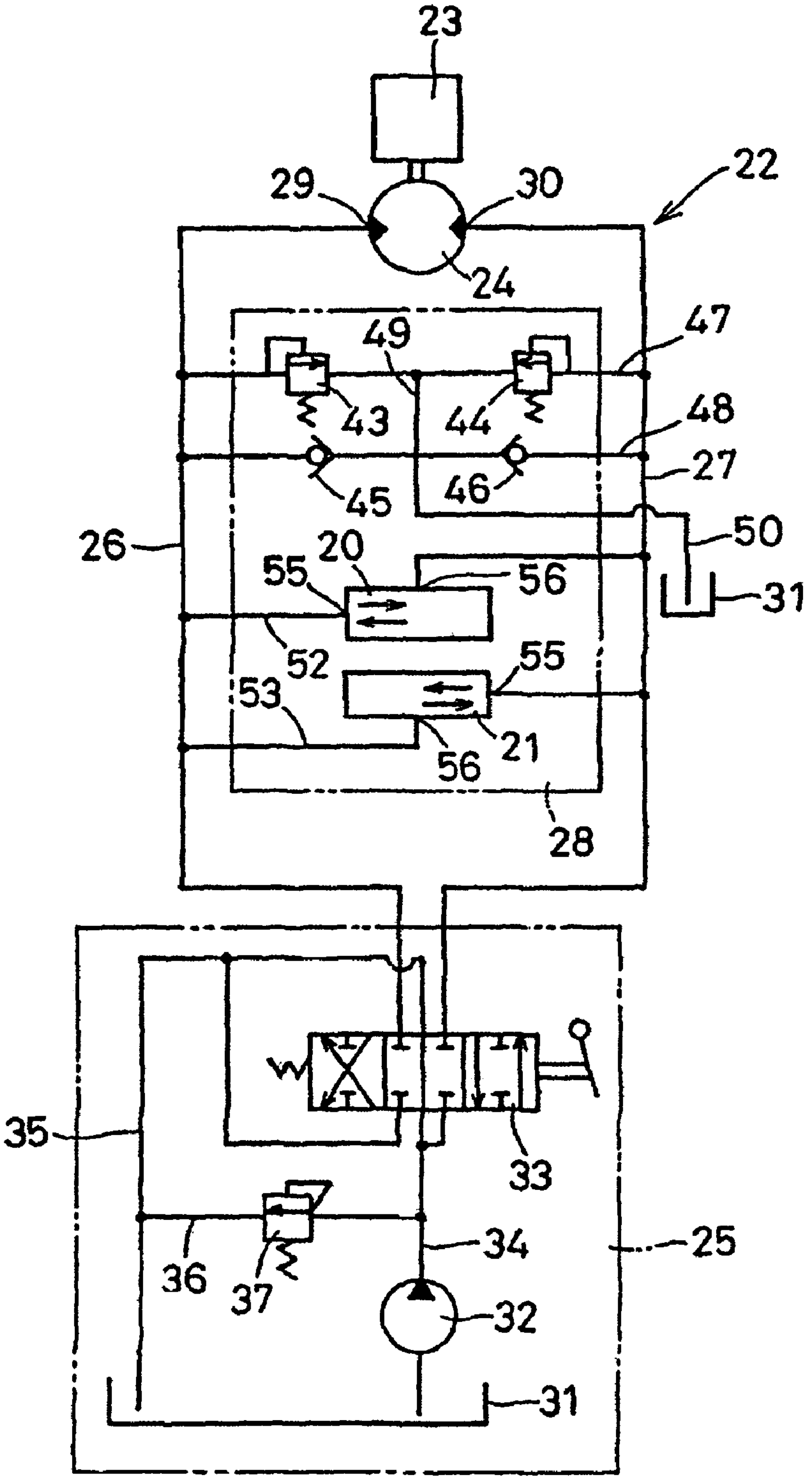
FIG. 2 is a view of a hydraulically powered system comprising the anti-reaction valve device.

FIG. 1 is a cross-sectional view of an anti-reaction valve device 20 in a first standby state according to an embodiment of the present invention. FIG. 2 is a view of a hydraulically powered system 22 comprising the anti-reaction valve device 20. Two anti-reaction valve devices 20 and 21 equipped in the hydraulically powered system 22 have the same construction. So, in FIGS. 1 and 2, the anti-reaction valve device 20 is illustrated, and the same references are used to identify the same or corresponding parts of the anti-reaction valve devices 20 and 21.

The hydraulically powered system 22 is configured to use hydraulic oil as a hydraulic fluid to cause an element 23 called an inertia body to be driven to move. More specifically, the hydraulically powered system 22 is mounted in a construction machine or an industrial machine, for example, a power shovel, and configured to cause the element 23 to be driven to rotate. The element 23 is mounted in the construction machine or the industrial machine such as the power shovel and forms a part of the construction machine or the industrial machine, for example, a turn table. The hydraulically powered system 22 comprises a hydraulically powered motor 24 which is a hydraulically powered actuator, a supply means 25, two input and output pipes 26 and 27, and a control valve unit 28 including the anti-reaction valve devices 20 and 21.

The hydraulically powered motor 24 has inlet and outlet ports 29 and 30 and is capable of rotating in opposite directions, i.e., clockwise and counterclockwise. The element 23 is mechanically connected to the hydraulically powered motor 24. When the hydraulically powered motor 24 rotates, the element 23 is driven to rotate. The supply means 25 serves to supply the hydraulic oil to the hydraulically powered motor 24. The input and output pipes 26 and 27 connect the inlet and outlet ports 29 and 30 to the supply means 25, respectively. The control valve unit 28 is equipped between the input and output pipes 26 and 27 and configured to control a pressure of the hydraulic oil of the input and output pipes 26 and 27. The anti-reaction valve devices 20 and 21 are connected between the input and output pipes 26 and 27 in such a manner that directional relationship of connection of primary ports 55 and secondary ports 56 is reversed between the anti-reaction valve devices 20 and 21, i.e., the hydraulic oil flows within the primary ports 55 in a reverse direction and flows within the secondary ports 56 in a reverse direction between the anti-reaction valve devices 20 and 21.

The supply means 25 comprises a tank 31, a hydraulic pump 32, a valve 33, a supply pipe 34, and a return pipe 35. The hydraulic oil is reserved in the tank 31. The supply pipe 34 and the return pipe 35 are connected to the tank 31. The hydraulic pump 32 is provided in the supply pipe 34 and configured to suction the hydraulic oil from the tank 31 and to discharge the hydraulic oil. The valve 33 is a 6-port-3-position directional control valve (or selector) provided as associated with connection of the supply pipe 34 and the return pipe 35 and the input and output pipes 26 and 27 and configured to switch fluidic connections of the supply pipe 34, the return pipe 35 and the input and output pipes 26 and 27. By operating the valve 33, the hydraulic oil is selectively supplied from the supply means 25 to the inlet port or outlet port 29 or 30.

The valve 33, at a neutral position, connects the supply pipe 34 to the return pipe 35 and disconnects the input and output pipes 26 and 27 from other pipes. Under this condition, the hydraulically powered motor 24 and hence the element 23 are in a stopped state. The valve 33, at a first supply position connects the supply pipe 34 to the input and output pipe 26 and the return pipe 35 to the input and output pipe 27. Under this condition, the hydraulically powered motor 24 is rotated in one direction, and hence, the element 23 is driven to rotate in one direction. The valve 33, at a second supply position, connects the supply pipe 34 to the input and output pipe 27 and the return pipe 35 to the input and output pipe 26. Under this condition, the hydraulically powered motor 24 is rotated in an opposite direction, and hence, the element 23 is driven to rotate in the opposite direction.

The supply means 25 is provided with a bypass relief valve 37 in a bypass pipe 36 through which the supply pipe 34 fluidically communicates with the return pipe 35 at a position between the hydraulic pump 32 and the valve 33. This makes it possible to inhibit a pressure between the hydraulic pump 32 and the valve 33 from becoming too high.

The control valve unit 28 comprises two bypass relief valves 43 and 44, and two one-way valves 45 and 46, in addition to the anti-reaction valve devices 20 and 21. First and second bypass pipes 47 and 48 are provided between the input and output pipes 26 and 27. The bypass relief valves 43 and 44 are provided in the first bypass pipe 47 and the one-way valves 45 and 46 are provided in the second bypass pipe 48.

The bypass relief valves 43 and 44 are configured in the same manner. Specifically, the bypass relief valves 43 and 44 are each configured to permit flow of the hydraulic oil from a primary port to a secondary port when a pressure of the hydraulic oil guided toward the primary port becomes not lower than a preset bypass relief pressure Ps. The bypass relief valves 43 and 44 are constructed in a way that their secondary ports are connected to the input and output pipes 26 and 27, respectively and their primary ports are connected to each other.

The one-way valves 45 and 46 are configured in the same manner. Specifically, the one-way valves 45 and 46 are each configured to permit a flow of the hydraulic oil from a primary port to a secondary port. The one-way valves 45 and 46 are constructed in a way that the secondary ports are connected to the input and output pipes 26 and 27, respectively and the primary ports are connected to each other.

The first bypass pipe 47 is connected to a connecting pipe 49 between the one-way valves 43 and 44 and the second bypass pipe 48 is connected to the connecting pipe 49 between the one-way valves 45 and 46. The connecting pipe 49 is connected to a discharge pipe 50 extending to the tank 31.

In the construction in which the bypass relief valves 43 and 44 and the one-way valves 45 and 46 are provided, if the pressure of the hydraulic oil of one of the input and output pipes 26 and 27 becomes not lower than the bypass relief pressure Ps, the hydraulic oil can be flowed to either the other of the input and output pipes 26 and 27 or to the tank 31. By doing so, it is possible to inhibit the pressure of the hydraulic oil in the input and output pipes 26 and 27 from becoming too high. As used herein, the term "the bypass relief pressure Ps" means a difference pressure between the pressure of the hydraulic oil in either the pipe 26 or 27 and the pressure of the hydraulic oil within the discharge pipe 50 leading to the tank 31.

The control valve unit 28 further comprises the anti-reaction valve devices 20 and 21. The anti-reaction valve devices 20 and 21 serve to inhibit the reaction occurring in the hydraulically powered motor 24 when the hydraulically powered motor 24 is stopped.

In a case where the valve 33 is operated to the neutral position so that supply of the hydraulic oil to the hydraulically powered motor 24 stops and thereby the hydraulically powered motor 24 stops driving the turn table in the state in which the hydraulic oil is supplied to the hydraulically powered motor 24 which is driving the turn table with the valve 33 being at the first or second supply position, the hydraulically powered motor 24 tends to continue rotate due to inertia. As a result, the pressure of the hydraulic oil in the input and output pipe 26(27) on the supply side becomes lower than the pressure of the hydraulic oil under the state in which the hydraulically powered motor 24 is driving and the pressure of the hydraulic oil in the input and output pipe 26(27) on the return side becomes higher than the pressure of the hydraulic oil under the state in which the hydraulically powered motor 24 is driving. The resulting different pressure in the hydraulic oil between the input and output pipes 26 and 27 causes the hydraulically powered motor 24 to rotate in the opposite direction to an original direction of the rotation of the hydraulically powered motor 24. Since the hydraulically powered motor 24 rotates in the opposite direction beyond a position at which the pressures of the hydraulic oil in the input and output pipes 26 and 27 become equal, it re-rotates in the original direction. Thus, when the hydraulically powered motor 24 is stopped, a "reaction" takes place, in which the hydraulically powered motor 24 counterrotates, i.e., rotates in opposite directions repeatedly. The anti-reaction valve devices 20 and 21 serve to inhibit such a reaction.

Anti-reaction pipes 52 and 53 are provided between the input and output pipes 26 and 27. The anti-reaction valve devices 20 and 21 are provided in the anti-reaction pipes 52 and 53, respectively. The anti-reaction valve device 20 is provided in the anti-reaction pipe 52 such that a primary port 55 is connected to the input and output pipe 26 and a secondary port 56 is connected to the input and output pipe 27. The anti-reaction valve device 21 is provided on the anti-reaction pipe 53 such that a primary port 55 is connected to the input and output pipe 27 and a secondary port 56 is connected to the input and output pipe 26. The anti-reaction valve devices 20 and 21 are connected between the input and output pipes 26 and 27 in such a manner that directional relationship of connection of primary ports 55 and secondary ports 56 is reversed between the anti-reaction valve devices 20 and 21.

Since the anti-reaction valve devices 20 and 21 are constructed in the same manner as described above, a detailed construction of only the anti-reaction valve device 20 will be described. The anti-reaction valve device 20 comprises a casing 60, a plunger 61, a sheet member 62, a piston 63, a spring drive means 64, and a one-way valve means 65. The anti-reaction valve device 20 has an axis L1, and the casing 60, the plunger 61, the sheet member 62, the piston 63, and the spring drive means 64 are arranged coaxially such that their axes conform to the axis L1.

The casing 60 is tubular. The casing 60 is mounted in a sealed state to a body 66 of the control valve unit 28 in such a manner that one end portion of the casing 60 in the axial direction is fitted in a concave portion of the body 66, and an opposite end portion thereof in the axial direction is closed by a plug 67. The casing 60 is provided with the primary port 55 on the one end portion in the axial direction and the secondary port 56 which is annular and located at an intermediate portion between both end portions in the axial direction so as to extend over an entire circumference of the casing 60.

The casing 60 has annular land portions 68 and 69 on an inner peripheral portion thereof. The land portions 68 and 69 are positioned to be spaced apart from each other in the axial direction and configured to protrude radially inward and to extend over the entire circumference of the casing 60. The land portions 68 and 69 separate an internal space of the casing 60 to define a plunger chamber 70, a sheet member chamber 71, and an open and close control chamber 72. These chambers 70 to 72 are arranged in the following order in the direction from the one end portion toward the opposite end portion in the axial direction: the sheet member chamber 71, the open and close control chamber 72, and the plunger chamber 70.

The plunger chamber 70 is closed by the plug 67, and fluidically communicates with the secondary port 56 through a secondary pressure introducing hole 74 formed in the casing 60. The sheet member chamber 71 opens in the axial direction to form the primary port 55, and therefore, is fluidically connected to the primary port 55. The open and close control chamber 72 is positioned between the plunger chamber 70 and the sheet member chamber 71 and fluidically communicates with the secondary port 56 through a valve passage 75 formed in the casing 60. A diameter of an inner peripheral face of a portion of the casing 60 which faces the plunger chamber 70 is larger than a diameter of an inner peripheral face of a portion of the casing 60 which faces the sheet member chamber 71.

The plunger 61 has a small-diameter portion 90 located at one end portion thereof, which has an outer diameter smaller than that of the remaining portion, and a flange portion 91 located at an opposite end portion thereof to extend radially outward. The plunger 61 is fitted in the plunger chamber 70. One end portion of the plunger 61 protrudes into the open and close control chamber 72 such that the small-diameter portion 90 is slidably fitted in a sealed state to the land portion 68 that defines the plunger chamber 70 and the control chamber 72. The plunger 61 is sidably movable in directions (one direction and opposite direction) X1 and X2 in the axial direction along the axis L1. As used herein, the direction X1 means a direction from the opposite end portion to which the plug 67 is attached toward the one end portion at which the primary port 55 is provided, and the direction X2 in the axial direction means an opposite direction with respect to the direction X1. Also, in FIG. 1, the direction X1 means rightward and X2 means leftward.

The flange portion 91 is sidably mounted on an inner peripheral portion of the portion of the casing 60 which faces the plunger chamber 70. The flange portion 91 separates the plunger 70 to define a spring space 95 on the right side and a back space 96 on the left side. The flange portion 91 is provided with a groove 97 through which the spring space 95 and the back space 96 communicate with each other. The plunger chamber 70 is fluidically connected to the secondary port 56.

The plunger 61 is provided with a cylinder bore 76 which opens in the plunger chamber 70 at the opposite end portion thereof, and a plunger inner bore 77 is formed in the cylinder bore 76 to open in a bottom thereof. The plunger inner bore 77 extends through the one end portion of the plunger 61 in the axial direction and opens at the one end portion in the axial direction.

The sheet member 62 has a rod portion 92 at the one end portion thereof and a piston portion 93 at an opposite end portion thereof. The piston portion 93 has an outer diameter larger than that of the rod portion 92. The sheet member 62 is fitted in the sheet member chamber 71. The piston portion 93 is sidably mounted in a sealed state on an inner surface portion 78 of a portion of the casing 60 which faces the sheet member chamber 71 so as to be movable in the axial directions X1 and X2. The piston portion 93 separates the sheet member chamber 71 to define a port space 80 directly connected to the primary port 55 and a damping space 82 communicating with the primary port 55 through a restricting hole 81. And, one end portion of the sheet member 62 protrudes into the open and close control chamber 72 such that the rod portion 92 is sidably mounted in a sealed state to the land portion 69 which defines the sheet member chamber 71 and the open and close control chamber 72.

The sheet member 62 is provided with an inner passage 85 which opens in the space 80 of the sheet member chamber 71. The inner passage 85 extends through the sheet member 62 in the axial direction and opens at one end portion in the axial direction. And, the sheet member 62 is movable into contact with and away from the plunger 61 within the open and close control chamber 72. The sheet member 62 has an annular tip end portion at one end portion thereof. The sheet member 62 contacts with the plunger 61 such that the tip end portion linearly contacts with the plunger 61. When the sheet member 62 contacts the plunger 61, the inner passage 85 and the plunger inner bore 77 are connected to each other and fluidically disconnected from the open and close control chamber 72. On the other hand, when the sheet member 62 moves away from the plunger 71, the inner passage 85 and the plunger inner bore 77 are connected to each other and fluidically connected to the control chamber 72.

The piston 63 is a cylindrical pin member. The piston 63 is slidably mounted in a sealed state to the cylinder bore 76 and movable in the axial directions X1 and X2. The axial dimension of the piston 63 is larger than the axial dimension of the cylinder bore 76. One end portion of the piston 63 partially protrudes from the cylinder bore 76 into the back space 96. And, both end portions of the piston 63 are semispherical.

The spring drive means 64 has first and second spring members 87 and 88. The first spring member 87 is externally fitted to a part of the plunger 61 and mounted on the land portion 68. An opposite end portion of the first spring member 87 is mounted on the flange portion 91. The first spring member 87 exerts a force (load) to the plunger 61 to cause the plunger 61 to move away from the sheet member 62 in the direction X2 in the axial direction. The second spring member 88 is externally fitted to a part of the sheet member 62 and configured such that one end portion thereof is mounted on the body 66 and an opposite end portion thereof is mounted on the piston portion 93 of the sheet member 62. The second spring member 88 exerts a force to the sheet member 62 to cause the sheet member 62 to move close to the plunger 61 in the direction X2 in the axial direction. The first spring member 87 has a spring constant larger than that of the second spring member 88, and hence the spring force exerted to the plunger 61 by the first spring member 87 is larger than the spring force exerted to the sheet member 62 by the second spring member 88.

When the primary pressure P1 is higher than the secondary pressure P2 in the first state and the difference pressure (hereinafter referred to as first difference pressure) ΔP12 obtained by subtracting the secondary pressure P2 from the primary pressure P1 decreases from not lower than a first predetermined set difference pressure PSH to a difference pressure not higher than a first open start difference pressure PSHO at a speed not lower than a first predetermined reduction speed, the spring drive means 64 drives the plunger 61 and the sheet member 62 in such a manner that the first and second spring members 87 and 88 exert the spring forces to cause the plunger 61 and the sheet member 62 to move away from each other. Also, when the secondary pressure P2 is higher than the primary pressure P1 in the second state and the difference pressure (second difference pressure) ΔP21 obtained by subtracting the primary pressure P1 from the secondary pressure P2 decreases from not lower than a second predetermined set difference pressure PSL to not higher than a second open start difference pressure PSLO at a speed not lower than a second predetermined reduction speed, the spring drive means 64 drives the plunger 61 and the sheet member 62 in such a manner that the first and second spring members 87 and 88 exert the spring forces to cause the plunger 61 and the sheet member 62 to move away from each other.

As used herein, the term "primary pressure" P1 means a pressure of the hydraulic oil on the primary port 55 side and the term "secondary pressure" P2 means a pressure of the hydraulic oil on the secondary port 56 side. The second set difference pressure PSL is lower than the first set difference pressure PSH. The first open start difference pressure PSHO is higher than the first set difference pressure PSH. The second open start difference pressure PSLO is higher than the second set difference pressure PSL and lower than the first set difference pressure PSH. In this embodiment, the first and second set difference pressures PSH and PSL and the second open start difference pressure PSLO are lower than the bypass relief pressure Ps and the first open start difference pressure PSHO is higher than the bypass relief pressure Ps. The first reduction speed and the second reduction speed may be equal or different from each other. When the above-stated reaction occurs, the pressures of the hydraulic oil in the input and output pipes 26 and 27 vary with an absolute value of the difference pressure between them decreasing at a reduction speed not lower than the first and second reduction speeds while changing high-low relationship between them in an alternate manner.

The one-way valve means 65 is provided between the secondary port 56 and the open and close control chamber 72, and is specifically provided in the valve passage 75. The one-way valve means 65 is configured to permit a flow of the hydraulic oil from the open and close control chamber 72 to the secondary port 56, and to inhibit a flow of the hydraulic oil from the secondary port 56 to the open and close control chamber 72.

In the anti-reaction valve device 20 so constructed, under the second state in which the secondary pressure P2 is higher then the primary pressure P1, the hydraulic oil in the plunger chamber 70 becomes the secondary pressure P2, and a pressing force obtained by multiplying the second difference pressure ΔP21 by a cross-sectional area ($=(\pi/4)\times d3^2$) of an outer diameter d3 of the small-diameter portion 90 is applied to the plunger 61 in the direction X1 in the axial direction. In the second state, therefore, the second difference pressure ΔP21 causes the plunger 61 and the sheet member 62 to respectively move in the direction X1 in the axial direction against the spring forces of the first and second spring members 87 and 88, and when the second difference pressure ΔP21 decreases from the bypass relief pressure Ps or the like, the plunger 61 and the sheet member 62 move in the direction X2.

In the anti-reaction valve device 20, an inner diameter d1 of a portion of the plunger 71 which faces the cylinder bore 76 and an outer diameter d2 of the rod portion 92 of the sheet member 62 are selected so as to establish a formula (1) represented below. The inner diameter d1 is substantially equal to and slightly larger than the outer diameter of the piston 63. In addition, the inner diameter d1 is larger than the outer diameter d3 of the small-diameter portion 90. The first set difference pressure PSH corresponds to a relief set pressure on a high-pressure side under the first state in which the primary pressure p1 is higher than the secondary pressure P2, and is set, for example, in a range of approximately 70 to 85% of the bypass relief pressure PS of the bypass relief valves 43 and 44. The second set difference pressure PSL corresponds to a relief set pressure on a low-pressure side under the second state in which the secondary pressure P2 is higher than the primary pressure P1, and is set, for example, in a range of approximately 10 to 25% of the bypass relief pressure PS of the bypass relief valves 43 and 44.

The first and second set difference pressures PSH and PSL are the first and second difference pressures ΔP12 and ΔP21 generated when the plunger 61 is moved in the direction X2 by the first spring member 87 and stopped by the piston 63, i.e., the plunger 61 has been moved to a stroke end of the plunger 61 in the direction X2 by the first spring member 18. The first and second set difference pressures PSH and PSL are also difference pressures which causes a force which balances with an initial set spring force FO of the first spring member 87. As used herein, the initial set spring force FO of the first spring member 87 means a spring force generated in the state in which the plunger 61 is located at leftmost position in the axial direction, i.e., the first spring member 87 is expanded as much as possible.

$$(d1^2-d2^2)\times PSH=d2^2\times PSL \tag{1}$$

How to derive the formula (1) will be specifically described. In the first state in which the primary pressure P1 is higher than the secondary pressure P2, a formula of force balance regarding the plunger 61 is given by a formula (2):

$$\frac{\pi\times(d1^2-d2^2)\times PSH}{4}=F0 \tag{2}$$

where the first difference pressure ΔP12 is PSH.

In the formula (2), a left side means a force for pressing the plunger 61 in the direction X1 and a right side means a force for pressing the plunger 61 in the direction X2. In this state, the plunger 61 and the sheet member 62 are moved in the direction X2 to a stroke end of the plunger 61.

In this state, when the first difference pressure ΔP12 increases, the plunger 61 is moved in the direction X1 against the first spring member 87 and enters a standby state for operation. To be precise, since the plunger 61 is in contact with the sheet member 62, consideration should be given to the spring force of the second spring member 88 when the plunger 61 is moved in the direction X1, but the spring force of the second spring member 88 is negligibly smaller than the spring force of the first spring member 87.

This standby state is shown in FIG. 1, in which the primary pressure P1 is higher than the secondary pressure P2, and the first and second spring members 87 and 88 are compressed as much as possible. In this state, since the primary pressure P1 is higher than the secondary pressure P2, the piston 23 is in contact with the plug 67.

In greater detail, the hydraulic oil in the spaces 95 and 96 of the plunger chamber 70 and the control chamber 72 has the secondary pressure P2. A force Fp12 for pressing the plunger 61 in the direction X1 by the secondary pressure P2 is represented by a formula (3):

$$Fp12=\left(\frac{\pi}{4}\times d5^2-\frac{\pi}{4}\times d1^2\right)\times P2-\left(\frac{\pi}{4}\times d5^2-\frac{\pi}{4}\times d3^2\right)\times P2-\left(\frac{\pi}{4}\times d3^2-\frac{\pi}{4}\times d2^2\right)\times P2 \tag{3}$$

where d5 is an inner diameter of the portion of the casing 60 which faces the plunger storage bore 20. The formula (3) is reduced to a formula (4):

$$Fp12=\left(\frac{\pi}{4}\times d2^2\right)\times P2-\left(\frac{\pi}{4}\times d1^2\right)\times P2 \tag{4}$$

The hydraulic oil in a sheet space 97 between the plunger 61 and the sheet member 62 and the cylinder bore 76 has the primary pressure P1. A force Fp11 for pressing the plunger 61 in the direction X1 in association with the primary pressure P1 is represented by a formula (5):

$$Fp11=\left(\frac{\pi}{4}\times d1^2\right)\times P1-\left(\frac{\pi}{4}\times d2^2\right)\times P1 \tag{5}$$

From the formulae (4) and (5), a force Fp11 plus Fp12 for pressing the plunger 61 in the direction X1 in association with the primary and secondary pressures P1 and P2 is represented by a formula (6):

$$Fp11 + Pp12 = \frac{\pi}{4} \times (P1 - P2)\,(d1^2 - d2^2) \tag{6}$$

The force Fp11 plus Fp12 represented by the formula (6) is a force against the spring force F of the first spring member 87. The formula (2) is derived by assigning the first set difference pressure PSH to the formula (6) as the first difference pressure ΔP12 with the force Fp11 plus Fp12 balancing with the initial set spring force F0 of the first spring member 87.

In the second state in which the secondary pressure P2 is higher than the primary pressure P1, a force balance formula regarding the plunger 61 is given by a formula (7), under the condition in which the second difference pressure ΔP21 is the second set difference pressure PSL.

$$\frac{\pi \times d3^2 \times PSL}{4} = \frac{\pi \times (d3^2 - d2^2) \times PSL}{4} + F0 \tag{7}$$

In the formula (7), a left side means a force for pressing the plunger 61 in the direction X1 and a right side means a force for pressing the plunger 61 in the direction X2. In this state, the plunger 61 and the sheet member 62 are moved in the direction X2 to a stroke end of the plunger 61.

In this state, when the second difference pressure ΔP21 increases, the plunger 61 is moved in the direction X1 against the first spring member 87 and enters a standby state for operation. This standby state is a second standby state in FIG. 7, in which the secondary pressure P2 is higher than the primary pressure P1, and the first and second spring members 87 and 88 are compressed as much as possible. Since the secondary pressure P2 is higher than the primary pressure P1, the piston 23 is pressed in the direction X1 together with the plunger 61.

In greater detail, in a state in which the primary and secondary pressures P1 and P2 are substantially equal to an atmospheric pressure (hereinafter referred to as an initial state), the plunger 61 and the sheet member 61 are in contact with each other under the spring force of the second pressure member 88 and are fluidically disconnected from the open and close control chamber 72 and the sheet member inner passage 85. Here, assume that the primary and secondary pressures P1 and P2 increase from the initial state.

In this state, the hydraulic oil in the spaces 95 and 96 of the plunger chamber 70 and the open and close control chamber 72 has the secondary pressure P2. A force Fp22 for pressing the plunger 61 in the direction X1 in association with the secondary pressure P2 is represented by a formula (8):

$$Fp22 = \frac{\pi \times d3^2}{4} \times P2 - \frac{\pi(d3^2 - d2^2)}{4} \times P2 \tag{8}$$

The hydraulic oil in the sheet space 97 between the plunger 61 and the sheet member 62 and the cylinder bore 76 has the primary pressure P1. A force Fp21 for pressing the plunger 61 in the direction X1 in association with the primary pressure P1 is represented by a formula (9):

$$Fp21 = \left(\frac{\pi}{4} \times d1^2\right) \times P1 - \left(\frac{\pi}{4} \times d2^2\right) \times P1 \tag{9}$$

The force Fp21 associated with the primary pressure P1 under the second state is equal to the force Fp11 associated with the primary pressure P1 under the first state represented by the formula (5).

A relationship established when the force Fp21 plus Fp22 for pressing the plunger 61 in the direction X balances with the initial set spring force F0 of the first spring member 87 in association with the primary and secondary pressures P1 and P2 is represented by a formula (10):

$$\frac{\pi \times d3^2}{4} \times P2 - \frac{\pi(d3^2 - d2^2)}{4} \times P2 + \frac{\pi(d1^2 - d2^2)}{4} \times P1 = F0 \tag{10}$$

It will be appreciated that a term regarding the primary pressure P1 is negligible because the second set difference pressure PSL is small and hence the primary pressure P1 is small, and a pressure-receiving area of the plunger 61 to which the primary pressure P1 is applied is small. Therefore, the formula (10) is reduced to a formula (11):

$$\frac{\pi \times d3^2}{4} \times P2 - \frac{\pi \times (d3^2 - d2^2)}{4} \times P2 = F0 \tag{11}$$

Assuming that the primary pressure P1 is equal to approximately zero, the second difference pressure ΔP21 becomes the secondary pressure P2. Further, by replacing the secondary pressure P2 by the second set difference pressure PSL assuming that P2=PSL, the formula (7) is derived. By reducing the formula (7), a formula (12) is derived with d3 excluded.

$$\frac{\pi \times d2^2 \times PSL}{4} = F0 \tag{12}$$

From the formulae (12) and (2), the formula (1) representing the relationship between the inner diameter d1 of the portion of the plunger 61 which faces the cylinder bore 76 and the outer diameter d2 of the rod portion 92 of the sheet member 62 is derived.

When the primary pressure P1 is higher than the secondary pressure P2 in the first state and the first difference pressure ΔP12 decreases from the difference pressure higher than the first set difference pressure PSH, and the plunger 61 is driven to move in the direction X2 by the first spring member 87, the plunger 61 stops being moved and reaches a stroke end if the first difference pressure ΔP12 becomes the first set difference pressure PSH. Also, when the secondary pressure P2 is higher than the primary pressure P1 in the second state and the second difference pressure ΔP21 decreases from the difference pressure higher than the second set difference pressure PSL, and the plunger 61 is driven to move in the direction X2 by the first spring member 87, the plunger 61 stops being moved and reaches a stroke end if the second difference pressure ΔP21 becomes the second set difference pressure PSL.

Thus, the anti-reaction valve devices 20 and 21 are configured to open when the difference pressure between the primary pressure P1 and the secondary pressure P2 rapidly decreases. More specifically, under the first state, when the first difference pressure ΔP12 is lower than the first set difference pressure PSH, the anti-reaction valve devices 20 and 21 are kept closed irrespective of a decrease in the first difference pressure ΔP12. Under the first state, when the first difference pressure ΔP12 is not lower than the first set difference pressure PSH and not higher than the first open start difference pressure PSHO, and decreases at a speed not lower than the first reduction speed, the anti-reaction valve devices 20 and 21 open. Under the first state, further, when the first difference pressure ΔP12 is higher than the first open start difference pressure PSHO, and decreases to not higher than the first open start difference pressure PSHO at a speed not lower than the first reduction speed, the anti-reaction valve devices 20 and 21 open. But the anti-reaction valve devices 20 and 21 do not open if the first difference pressure ΔP12 decreases at a speed not higher than the first reduction speed.

Under the second state, when the second difference pressure ΔP21 is lower than the second set difference pressure PSL, the anti-reaction valve devices 20 and 21 are kept closed irrespective of a decrease in the second difference pressure ΔP21. Under the second state, when the second difference pressure ΔP21 is not lower than the second set difference pressure PSL and not higher than the second open start difference pressure PSLO, and the second difference pressure ΔP21 decreases at a speed not lower than the second reduction speed, the plunger 61 and the sheet member 62 move away from each other with the one-way valve means 65 kept closed. Under this condition, if the high-low pressure relationship between the primary and secondary pressures P1 and P2 is reversed, i.e., the secondary pressure P2 becomes higher than the primary pressure P1, the one-way valve means 65 opens and the anti-reaction valve devices 20 and 21 open. Further, under the second state, when the second difference pressure ΔP21 is higher than the second open start difference pressure PSLO, and decreases to not higher than the second open start difference pressure PSLO at a speed not lower than the second reduction speed, the plunger 61 and the sheet member 62 move away from each other with the one-way valve means 61 kept closed. Under this condition, if the high-low pressure relationship between the primary and secondary pressures P1 and P2 is reversed such that the secondary pressure P2 becomes higher than the primary pressure P1, the one-way valve means 65 opens and the anti-reaction valve devices 20 and 21 open. But the anti-reaction valve devices 20 and 21 do not open if the second difference pressure ΔP21 decreases at a speed not higher than the second reduction speed.

When the first difference pressure ΔP12 decreases from not lower than the first open start difference pressure PSHO to lower than the first open start difference pressure PSHO, the plunger 61 starts to be moved in the direction X2 by the spring force exerted by the first spring member 87, upon the first difference pressure ΔP12 becoming the first open start difference pressure PSHO.

The second open start difference pressure PSLO is the second difference pressure ΔP21 generated when the second difference pressure ΔP21 increases from the initial state, thereby causing the plunger 61 to be moved in the direction X1 against the spring force of the first spring member 87, and to enter the second standby state, i.e., the plunger 61 has moved to the stroke end in the direction X1 against the first spring member 87. And, the second open start difference pressure PSLO is the difference pressure causing a force which balances with a maximum spring force F1 of the first spring member 87. Therefore, when the second difference pressure ΔP21 decreases from not lower than the second open start difference pressure PSLO to lower than the second open start difference pressure PSLO, the plunger 61 starts to be moved in the direction X1 by the spring force exerted by the first spring member 87, upon reaching the second difference pressure ΔP21 becoming the second open start difference pressure PSLO.

In this embodiment, since the bypass relief pressure Ps is set lower than the first open start difference pressure PSHO, the anti-reaction valve devices 20 and 21 are configured in a way that the first and second difference pressures ΔP12 and ΔP21 do not become higher than the bypass relief pressure Ps, and the first open start difference pressure PSHO is not included in an operation range. In other words, the first and second anti-reaction valve devices 20 and 21 are configured to operate in the range not higher than the bypass relief pressure Ps between the first set difference pressure PSH and the first open start difference pressure PSHO.

Figure 3:
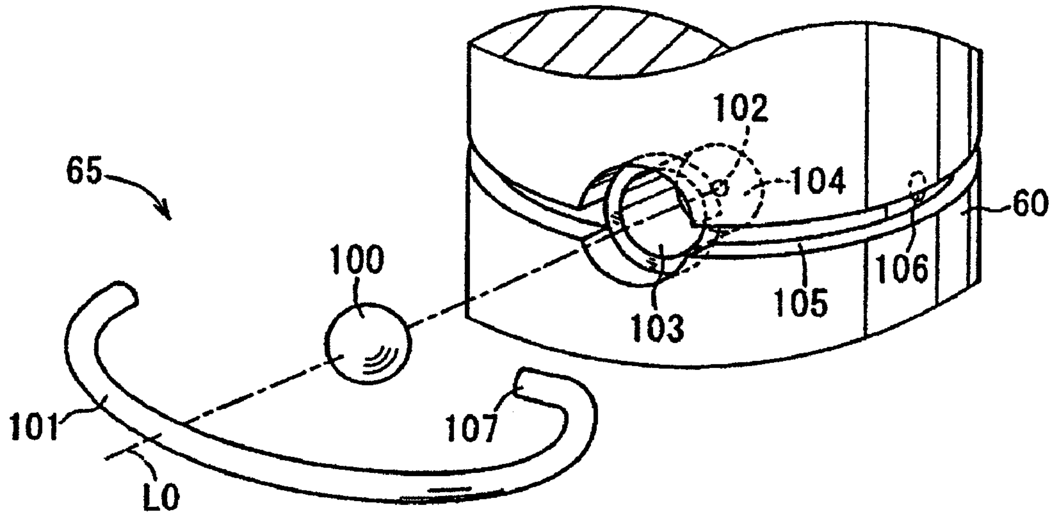
FIG. 3 is an exploded perspective view of a one-way valve means.
Figure 4:
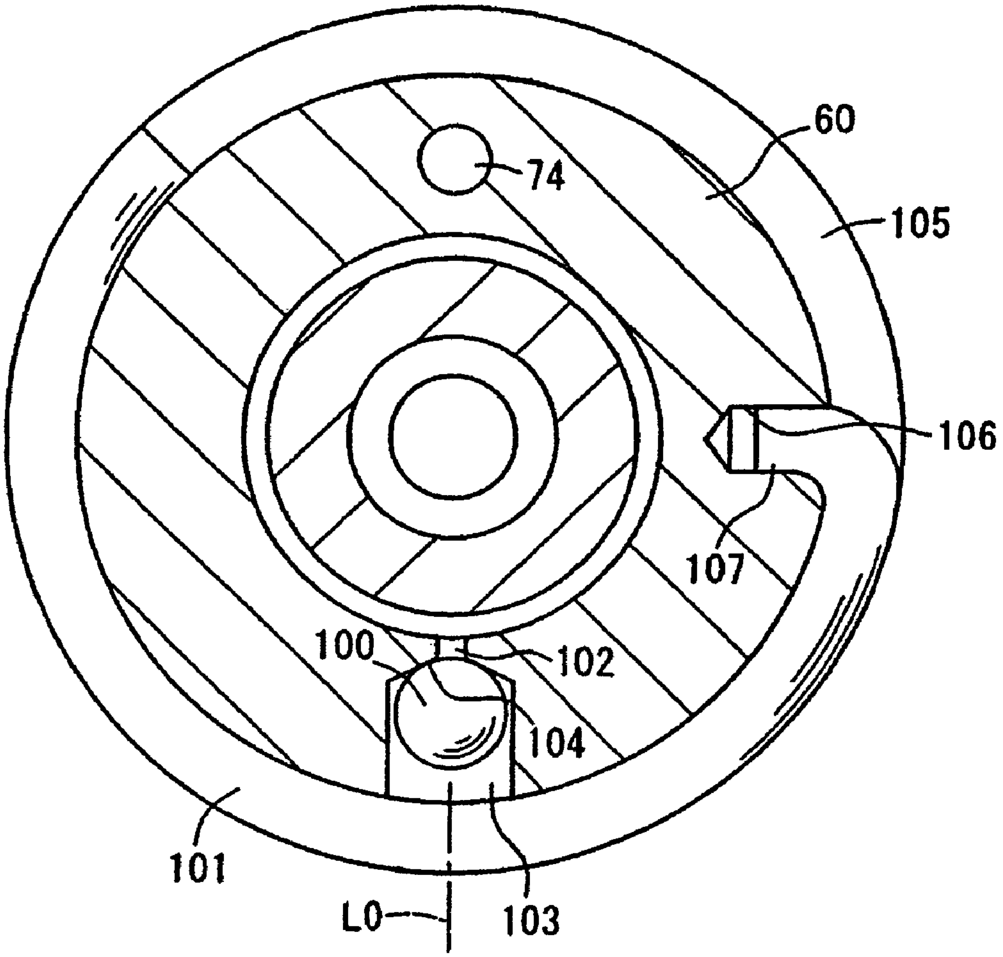
FIG. 4 is a cross-sectional view taken along line S4—S4 in FIG. 1.
Figure 5:
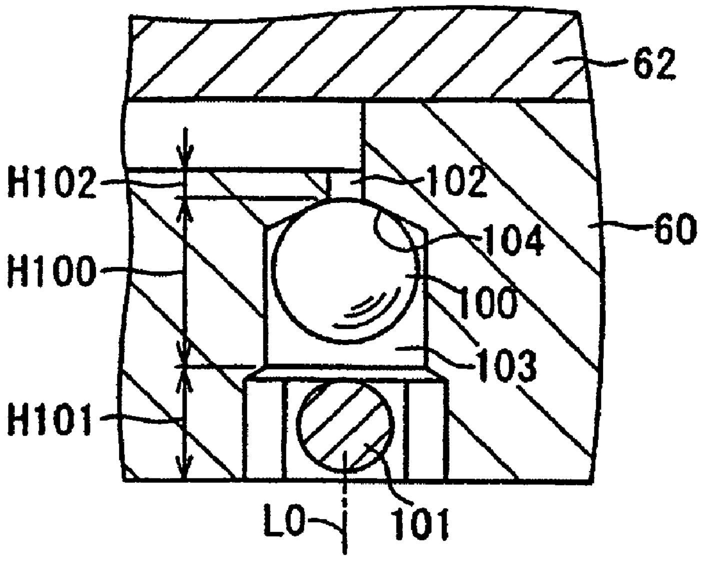
FIG. 5 is an enlarged cross-sectional view of a structure including the one-way valve means in FIG. 1.

FIG. 3 is an exploded perspective view of the one-way valve means 65. FIG. 4 is a cross-sectional view taken along line S4—S4 in FIG. 1. FIG. 5 is an enlarged cross-sectional view of a structure including the one-way valve means 5. The one-way valve means 65 is comprised of a valve plug 100 and a stopper member 101. The one-way valve means 65, and the casing 60 constitute a one-way valve device.

The casing 60 is provided with a valve bore 102 extending along a predetermined reference axis L0, a valve plug space 103 continuous with the valve bore 102, and a valve seat 104 enclosing the valve bore 102. More specifically, the casing 60 is substantially cylindrical, and the valve bore 102 extends along the reference axis L0 extending in the radial direction of the casing 60. And, the valve plug space 103 extends continuously with the valve bore 102 to be located radially outward relative to the valve bore 102 in the casing 60. The reference axis L0 is perpendicular to the axis L1.

The valve plug 100 is spherical and is housed with a clearance in the valve plug space 103. The valve plug 100 is movable along the reference axis L0, and is movable to seat on and away from the valve seat 104. The stopper member 101 extends to cross the reference axis L0. The stopper member 101 is located on the opposite side of valve bore 102 with respect to the valve plug 100, and engages with a portion of the casing 60 which is different from the portion where the valve bore 102 is formed. The stopper member 101 serves to inhibit the valve plug 100 from being taken out from the valve plug space 103.

The stopper member 101 is substantially circular-arc shaped to extend over a range exceeding 180 degrees in a substantially circumferential direction of the casing 60, specifically around the axis L1 in FIG. 1. A groove 105 is formed along an outer periphery of the casing 60 over an entire circumference so as to cross the reference axis L0. The groove 105 is recessed radially inward of the casing 60. The stopper member 101 is fitted to an outer peripheral portion of the casing 60 with the stopper member 101 fitted in the groove 105.

The casing 60 is also provided with a concave portion 106. The stopper member 101 has a protrusion 107 which is fitted in the concave portion 106. More specifically, the concave portion 106 is located radially inward relative to the groove 105 so as to be apart from the valve bore 103 around the valve axis L1 in the circumferential direction, specifically, about 90 degrees. An end portion of the stopper member 101 is bent radially inward relative to the circular-arc along which the stopper member 101 extends to form a protrusion 107 protruding radially inward. The stopper member 101 is provided to cover the valve plug 100 from radially outward of the casing 60 so as to cross the reference axis L0 with the protrusion 107 fitted in the concave portion 106.

Figure 6:
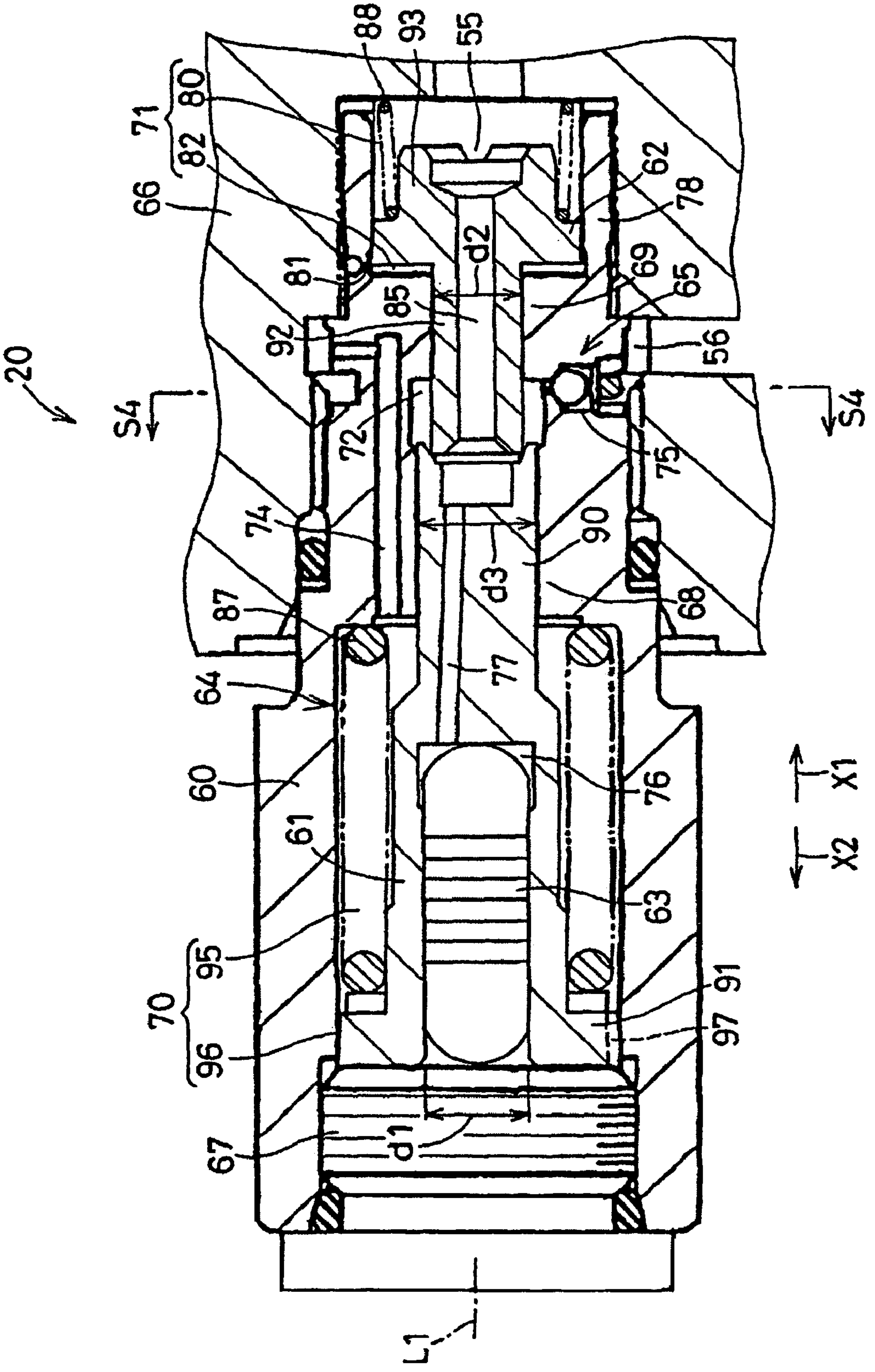
FIG. 6 is a cross-sectional view of the anti-reaction valve device in an initial state.
Figure 7:
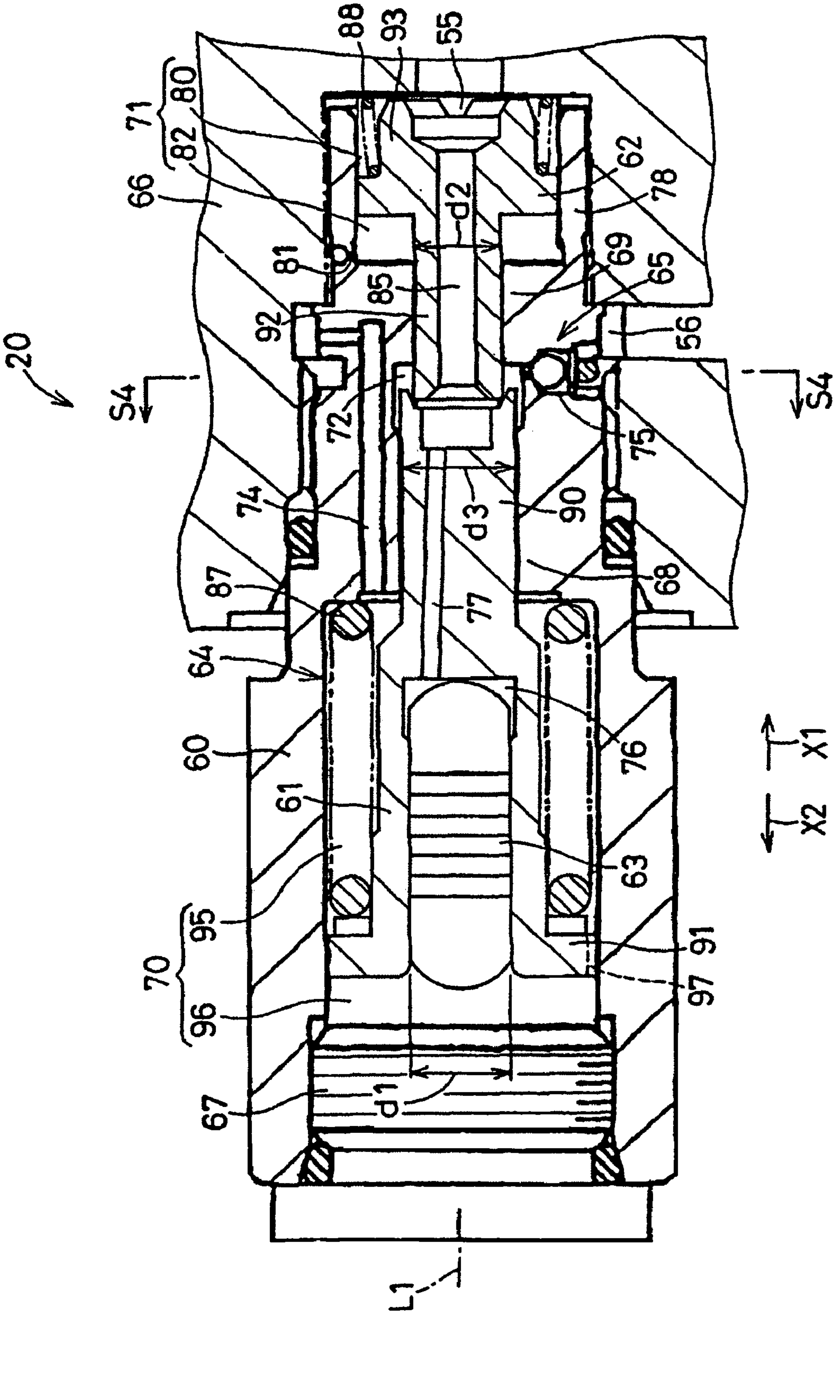
FIG. 7 is a cross-sectional view of the anti-reaction valve device in a second standby state.
Figure 8:
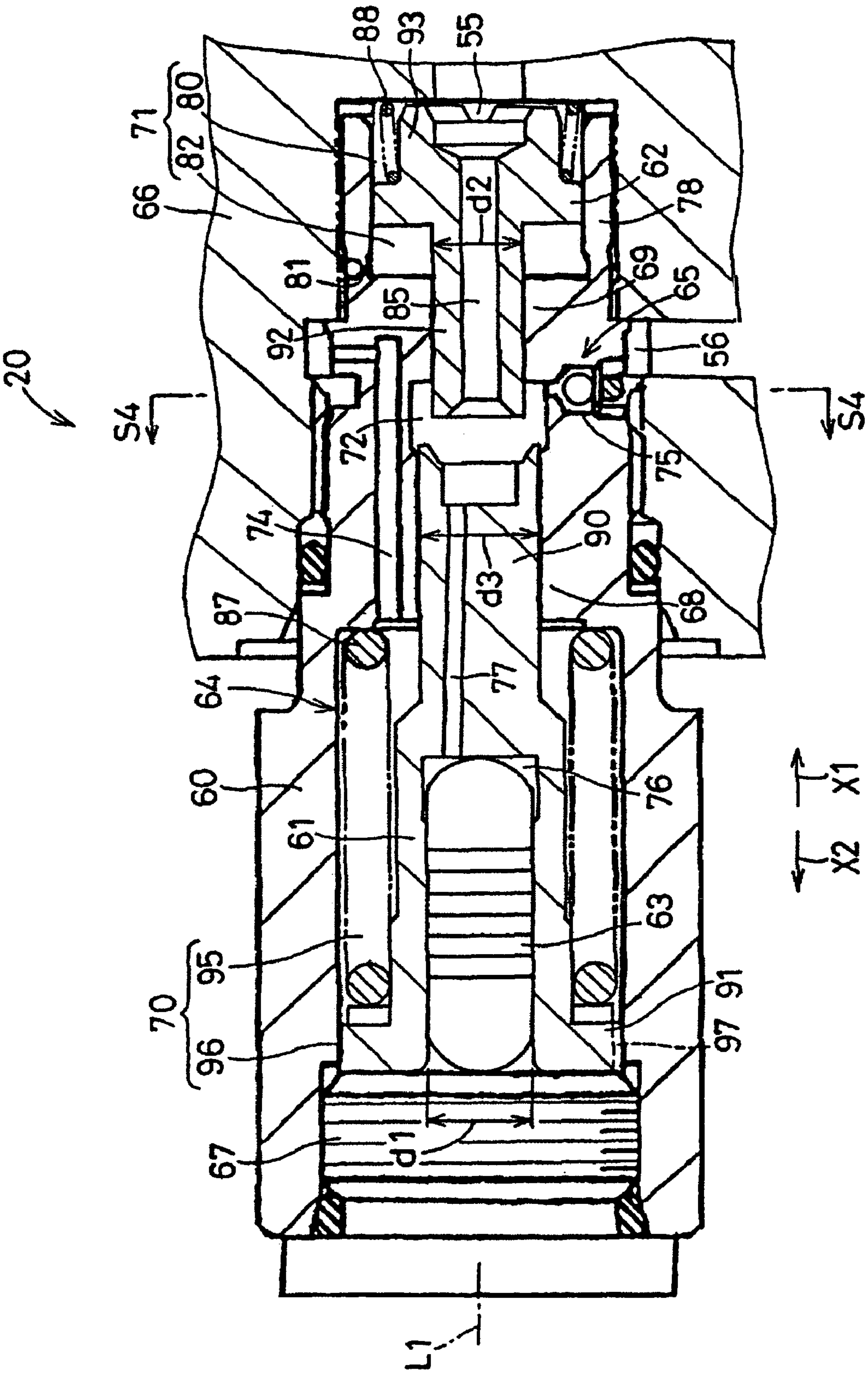
FIG. 8 is a cross-sectional view of the anti-reaction valve device in an open state.
Figure 9:
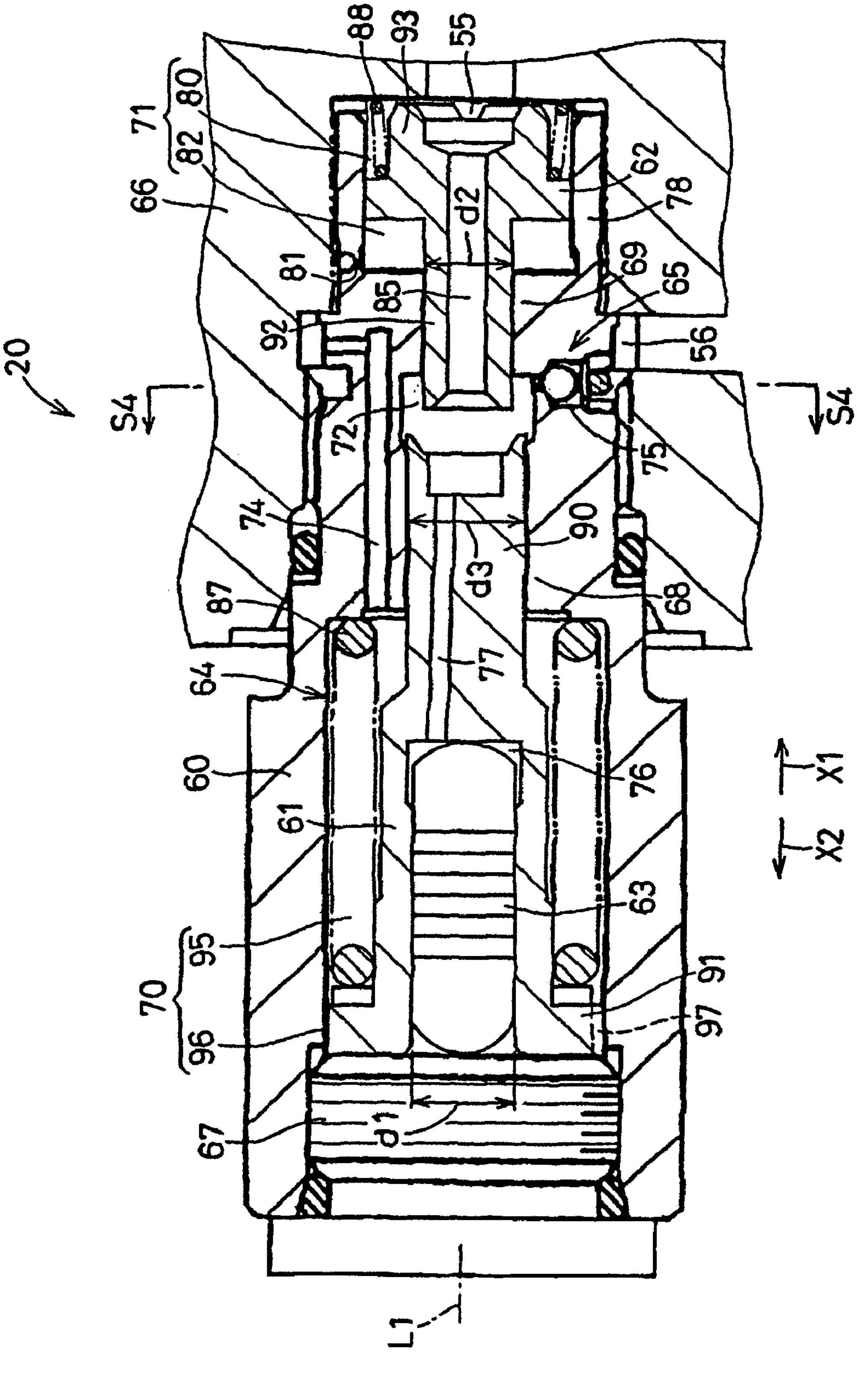
FIG. 9 is a cross-sectional view of the anti-reaction valve device in a closed state.
Figure 10:
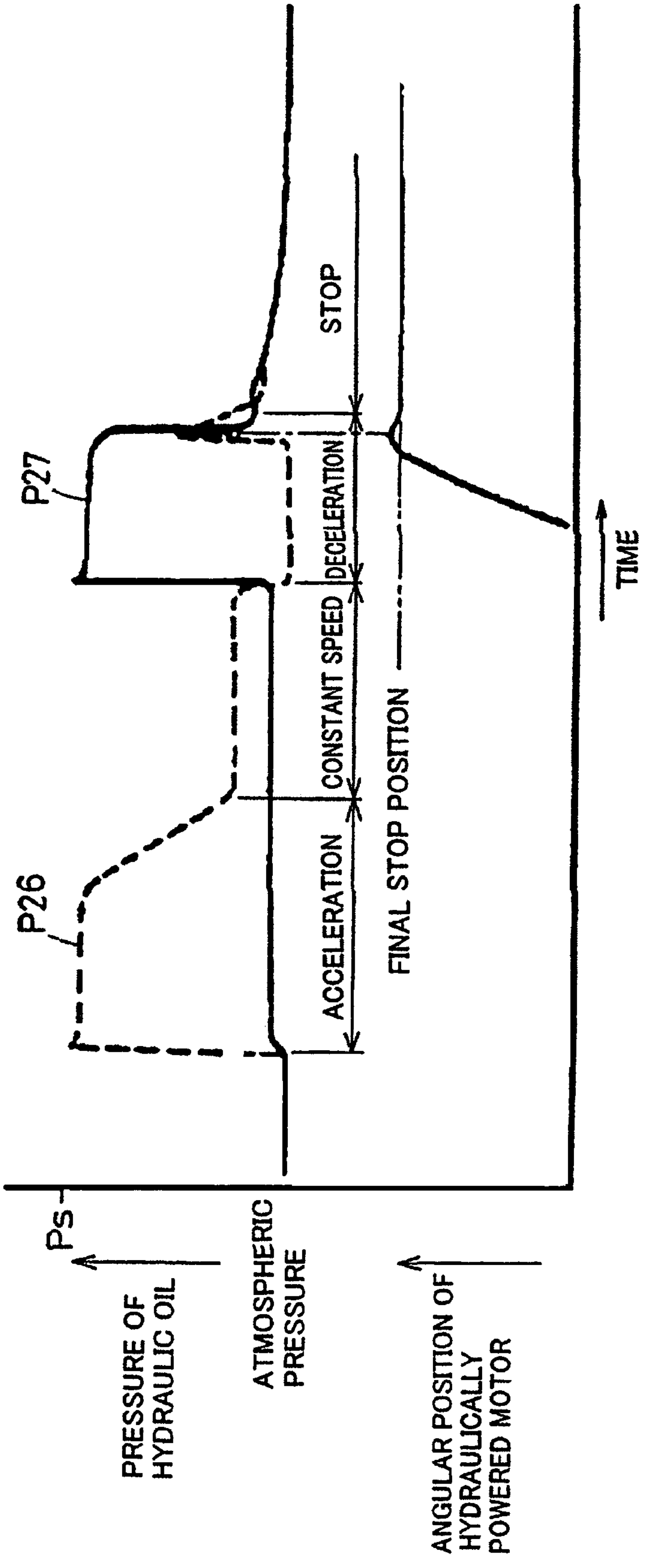
FIG. 10 is a graph showing an example of a pressure of hydraulic oil and an angular position of a hydraulically powered motor in a hydraulically powered system.

FIG. 6 is a cross-sectional view of the anti-reaction valve device 20 in an initial state. FIG. 7 is a cross-sectional view of the anti-reaction valve device 20 in a second standby state. FIG. 8 is a cross-sectional view of the anti-reaction valve device 20 in an open state. FIG. 9 is a cross-sectional view of the anti-reaction valve device 20 in a closed state. FIG. 10 is a graph showing an example of the pressure of the hydraulic oil and the angular position of the hydraulically powered motor 24 in the hydraulically powered system 22. In the hydraulically powered system 22, the anti-reaction valve devices 20 and 21 are in the initial state in FIG. 6 when the valve 33 is at the neutral position and the hydraulically powered motor 24 is in a stopped state. Upon the valve 33 being operated to the first supply position, the hydraulic oil is supplied to the hydraulically powered motor 24 through the input and output pipe 26, and collected from the hydraulically powered motor 24 through the input and output pipe 27. Thereby, the hydraulically powered motor 24 rotates to drive the element 23.

When the hydraulically powered motor 24 is accelerated, the pressure P26 of the hydraulic oil in the input and output pipe 26 (hereinafter referred to as one pipe pressure) is the bypass relief pressure Ps of the bypass relief valve 43, and the pressure P27 of the hydraulic oil in the input and output pipe 27 (hereinafter referred to as an opposite pipe pressure) is substantially an atmospheric pressure. Therefore, a difference pressure ("first pipe difference pressure") ΔP67 obtained by subtracting the opposite pipe pressure P27 from the one pipe pressure P67 is the bypass relief pressure Ps by the bypass relief valve 43. Although the first pipe difference pressure ΔP67 is different from the bypass relief pressure Ps in a strict sense, the difference is small, and assumed to be equal for easier understanding.

Under this condition, the anti-reaction valve device 20 is in the standby state in FIG. 1, and the anti-reaction valve device 21 is in the second standby state in FIG. 7. Since the bypass relief pressure Ps is set higher than the first set pressure PSH and less than the first open start difference pressure PSHO in this embodiment, the anti-reaction valve devices 20 and 21 do not become the first standby state. But, for easier understanding, assume that the first and second anti-reaction valve devices 20 and 21 are in the first standby state when the first difference pressure ΔP12 is the bypass relief pressure Ps. In the anti-reaction valve devices 20 and 21, the plunger 61 is located at a stroke end position in the direction X1 and the first spring members 87 and 88 are compressed as much as possible and are both closed.

When the hydraulically powered motor 24 transitions from the accelerated state to a constant-speed rotation state, the one pipe pressure P26 decreases from the bypass pressure Ps to a pressure required for keeping rotation of the hydraulically powered motor 24 at a predetermined rotational speed. Correspondingly, the first pipe difference pressure ΔP67 becomes lower than the first set difference pressure PSH.

In the anti-reaction valve device 20, therefore, the plunger 61 is moved in the direction X2 by the first spring member 87, and correspondingly, the sheet member 62 is moved in the direction X2 by the second spring member 88. In this case, since the reduction speed of the first difference pressure ΔP12 is lower than the first reduction speed, and the movement speed of the plunger 61 is slow, the sheet member 62 can follow the plunger 61 at substantially the same speed, irrespective of a restricted speed due to damping of the orifice 38, and hence the plunger 61 and the sheet member 62 keep in contact with each other. Then, the plunger 61 and the sheet member 62 are restored to the initial state in FIG. 6. As in the anti-reaction valve device 20, in the anti-reaction valve device 21, the plunger 61 and the sheet member 62 are moved from the state in FIG. 7, while keeping the closed state because the reduction speed of the second difference pressure ΔP21 is not higher than the second reduction speed. In this closed state, the plunger 61 and the sheet member 62 are restored to the initial state in FIG. 6.

When the valve 33 is switched to the neutral position in the above-stated constant-speed rotation state in order to stop the operation of the element 23 and the hydraulically powered motor 24, the one pipe pressure P26 decreases. At this time, the hydraulically powered motor 24 continues to rotate due to inertia irrespective of the decrease in the one pipe pressure P26. Since the hydraulic oil is drawn from the input and output pipe 26 and discharged to the input and output pipe 27 by a pumping action of the hydraulically powered motor 24, the opposite pipe pressure P27 rapidly decreases.

Thereby, the bypass relief valve 44 opens, and the difference pressure (second pipe difference pressure) ΔP76 obtained by subtracting the one pipe pressure P26 from the opposite pipe pressure P27 is the bypass relief pressure Ps because of the bypass relief valve 44. The hydraulically powered motor 24 is braked by the second pipe difference pressure ΔP76. When the hydraulically powered motor 24 is thus decelerated, the anti-reaction valve device 20 is in the second standby state in FIG. 7, and the anti-reaction valve device 21 is in the first standby state in FIG. 1. In the anti-reaction valve devices 20 and 21, the first and second spring members 87 and 88 are compressed as much as possible and closed.

When deceleration of the hydraulically powered motor 44 comes close to an end, and the second pipe difference pressure ΔP76 decreases from the bypass relief pressure Ps, the bypass relief valve 44 is closed, and then the hydraulically powered motor 24 stops. When the hydraulically powered motor 24 stops, the opposite pipe pressure P27 is higher than the one pipe pressure P26, and therefore, the hydraulically powered motor 24 rotates in the opposite direction, i.e., counterrotates. Upon start of the counterrotation, since the pumping action of the hydraulically powered motor 24 causes the hydraulic oil to be suctioned from the input and output pipe 27 and to be discharged to the input and output pipe 26, the opposite pipe pressure P27 rapidly decreases at a reduction speed, for example, at a reduction speed not lower than the first reduction speed and not lower than the second reduction speed.

When the opposite pipe pressure P27 decreases rapidly as described above, in the anti-reaction valve device 21, the first difference pressure ΔP12 decreases from not lower than the first set difference pressure PSH to not higher than the first set difference pressure PSH at the reduction speed not lower than the first reduction speed. More specifically, in the anti-reaction valve device 21, the first difference pressure ΔP12 decreases from the bypass relief pressure Ps not lower than the first set difference pressure PSH. And, the plunger 61 and the sheet member 62 start to be moved in the direction X2 by the first and second spring members 87 and 88.

During this operation, the plunger 61 is moved in the direction X2 at a high speed by the first spring member 87, while the sheet member 62 is moved in the direction X2 at a speed lower than that of the plunger 61 due to the damping of the orifice 81. The plunger 61 and the sheet member 62 move away from each other in the anti-reaction valve device 21, thereby causing the anti-reaction valve device 21 to open. Thereby, the hydraulic oil in the input and output pipe 27 flows from the primary port 55 to the secondary port 56 through the anti-reaction valve device 21, and into the input and output pipe 26.

When the opposite pipe pressure P27 thus decreases and the first difference pressure ΔP12 becomes the first set difference pressure PSH in the anti-reaction valve device 21, the anti-reaction valve device 21 opens as shown in FIG. 8, and the plunger 61 of the anti-reaction valve device 21 moves to a stroke end position in the direction X2 and is stopped by the piston 6. At this time, an opening degree of the anti-reaction valve device 21 becomes maximum, and a flow amount of the hydraulic oil becomes maximum. Under this condition, since the second difference pressure ΔP21 is higher than the second open start difference pressure PSLO in the anti-reaction valve device 20, the anti-reaction valve device 20 is in the second standby state in FIG. 7, and is hence kept closed.

When the second pipe difference pressure ΔP67 decreases in this state, the sheet member 62 is being moved slowly in the direction X2 in the anti-reaction valve device 21, and hence the anti-reaction valve device 21 is open. When the second pipe difference pressure ΔP67 thus decreases, the first difference pressure ΔP12 decreases in the anti-reaction valve device 21, which opens in association with the first set difference pressure PSH. Therefore, by releasing the hydraulic oil from the input and output pipe 27 to the input and output pipe 26 through the anti-reaction valve device 21, the counterrotation of the hydraulically powered motor 24, which is a first wave, is inhibited.

When the second pipe difference pressure ΔP67 further decreases in this state and becomes the second open start difference pressure PSLO, the plunger 61 and the sheet member 62 start to be moved in the direction X2 by the first and second spring members 87 and 88 in the anti-reaction valve device 20. That is, in the anti-reaction valve device 20, the second difference pressure ΔP21 decreases from the bypass relief set pressure Ps which is the difference pressure not lower than the second set difference pressure PSL to not higher than the second open start difference pressure PSLO at a reduction speed not lower than the second reduction speed. And, when the second difference pressure ΔP21 decreases to the second open start difference pressure PSLO, the plunger 61 and the sheet member 62 start to be moved in the direction X2 by the first second spring members 87 and 88.

During this operation, the plunger 61 is moved in the direction X2 at a high speed by the first spring member 87, while the sheet member 62 is moved in the direction X2 at a speed lower than that of the plunger 61 due to the damping of the orifice 81. This causes the plunger 61 and the sheet member 62 to move away from each other in the anti-reaction valve device 20. At this time, the anti-reaction valve device 20 is in a closed state in FIG. 9, in which the one-way valve means 65 is closed and the anti-reaction valve device 20 is closed.

When the opposite pipe pressure P27 further decreases, the one pipe pressure P26 increases at a high speed. Before the sheet member 62 comes contact with the plunger 61, i.e., with the state the plunger 61 and the sheet member 62 being kept distant from each other, the high-low relationship between the one pipe pressure P26 and the opposite pipe pressure P27 is reversed.

Thereby, the one pipe pressure P26 becomes higher than the opposite pipe pressure P27. And, in the anti-reaction valve 20, the one-way valve means 65 opens with the plunger 61 and the sheet member 62 being distant from each other, the anti-reaction valve device 20 becomes substantially the open state in FIG. 8. In this open state, the hydraulic oil is released through the anti-reaction valve device 20 from the input and output pipe 26 to the input and output pipe 27, and re-counterrotation of the hydraulically powered motor 24, which is a second wave, is inhibited. At this time, the anti-reaction valve device 21 is at least at a closed position by the one-way valve means 65.

Through the above described series of operations, the anti-reaction of the motor 24 is inhibited. Such anti-reaction can be also inhibited in the same manner when the hydraulically powered motor 24 is rotated in the opposite direction and then stopped, although the operations of the anti-reaction valve devices 20 and 21 are reversed.

In accordance with this embodiment of the present invention, under the first state, when the first difference pressure ΔP12 decreases from not lower than the first set difference pressure PSH to not higher than the first open start difference pressure PSHO at the reduction speed not lower than the first reduction speed in the anti-reaction valve devices 20 or 21, the plunger 61 and the sheet member 62 move away from each other, thereby causing the anti-reaction valve device 20 or 21 to open. Under this condition, the hydraulic oil flows from the primary port 55 to the secondary port 56. In addition, under the second state, when the second difference pressure ΔP21 decreases from not lower than the second set difference pressure PSL to not higher than the second open start difference pressure PSLO at the reduction speed not lower than the second reduction speed in the anti-reaction valve devices 20 or 21, the plunger 61 and the sheet member 62 move away from each other. Since the secondary pressure P2 is higher than the primary pressure P1 in this state, the flow of the hydraulic oil from the secondary port 56 to the open and close control chamber 72 is inhibited by the one-way valve means 65, and the anti-reaction valve devices 20 and 21 are closed. Under this state, when the primary pressure P1 becomes higher than the secondary pressure P2, the anti-reaction valve devices 20 and 21 open, and the hydraulic oil flows from the primary port 55 to the secondary port 56.

A set of the above constructed anti-reaction valve devices 20 and 21 are connected between the input and output pipes 26 and 27 hydraulically connected to the hydraulically powered motor 24 in such a manner that directional relationship of connection of the primary port and the secondary port between the input and output pipes 26 and 27 is reversed between the anti-reaction valve devices 20 and 21, and are capable of inhibiting the anti-reaction of the hydraulically powered motor 24 which may take place when the motor 24 is stopped. In addition, the anti-reaction valve devices 20 and 21 are configured to open in association with the first and second set difference pressures PSH and PSL, and are capable of inhibiting first and second (subsequent) counterrotation of the hydraulically powered motor 24. Thus, the anti-reaction valve devices 20 and 21 are capable of inhibiting the anti-reaction of the hydraulically powered motor 24 quickly and reliably.

In a case where the hydraulically powered motor 24 is operated for a short time, i.e., rotated for a short time, and then stopped, the anti-reaction can be inhibited by causing the plunger 61 and the sheet member 62 to be distant from each other in association with the second set difference pressure PSL in the first counterrotation, and by inhibiting the subsequent counterrotation.

Besides, the one-way valve means 65 configured to open in association with the first and second set difference pressures PSH and PSL is positioned between the secondary port 56 and the open and close control chamber 72 within which the plunger 61 and the sheet member 62 are brought into contact with and away from each other. The one-way valve means 65 serves to inhibit confinement of a fluid leaking into a gap between the plunger 61 and the sheet member 62 through a clearance between components, for example, between the sheet member 62 and the plunger 61 or a clearance between the plunger 61 and the piston 63, thus inhibiting the sheet member 62 and the plunger 61 from moving away from each other, when the secondary pressure P2 is higher than the primary pressure P1. In addition, the one-way valve means 65 is capable of releasing such a fluid. Therefore, malfunction caused by such leakage of the fluid can be reliably inhibited. So, the hydraulic powered motor 24 which is not equipped with a brake means will not rotate undesirably.

In the one-way valve device equipped with the one-way valve means 65, also, the valve plug 100 is housed within the valve plug space 103 of the casing 60, and is configured to set in and move away from the valve seat 104 to open and close the valve bore 102. The valve plug 100 is stopped by the stopper member 101 provided on the opposite side of the valve bore 102 with respect to the valve plug 100. The stopper member 101 extends to cross the reference axis L0 and engages with the portion of the casing 60 which is different from the portion where the valve plug space 103 is formed.

Since the stopper member 101 is configured to engage with the portion of the casing 60 which is different from the portion where the valve plug space 103 is formed, the thickness of the stopper member 101 is reduced, i.e., the dimension of the stopper member 101 in the direction of the reference axis L0 is reduced, compared to a construction using a screw member screwed to the inner peripheral portion of the portion of the casing 60 which faces the valve plug space 103 or a construction using a stop ring fitted to the outer peripheral portion of the portion of the casing 60 which faces the valve plug space 103. In other words, regarding the direction along the reference axis L0, a thickness H102 of a seat portion of the valve bore 102 and a thickness H100 of a portion where the valve plug 100 is disposed are necessary as in the conventional structure, but a dimension H101 required to stop the valve plug 100 is made as small as the dimension of the stopper member 101. The dimension H101 required to stop the valve plug 100 can be reduced, compared to the conventional structure using the inner peripheral portion of the casing 60 which faces the valve plug space 103 because the inner peripheral portion is not used to stop the valve plug 100. Therefore, the one-way valve device can be provided by using a thin portion as the casing 60. Consequently, the anti-reaction valve devices 20 and 21 can be suitably provided.

Further, the one-way valve device can be easily assembled without troubles by housing the valve plug 100 within the valve plug space 103 and by mounting the stopper member 101. In addition, it is possible to easily assemble a one-way valve device which permits a small flow rate of fluid and is small in inner diameter of the portion of the casing 60 which faces the valve plug space 103.

The casing 60 is cylindrical. The stopper member 101 is substantially circular-arc shaped to extend over a range exceeding 180 degrees substantially in the circumferential direction and is fitted to the outer peripheral portion of the casing 60. The stopper member 101 is easily mounted to the casing 60 by fitting the stopper member 101 to the outer peripheral portion of the casing 60.

The casing 60 is provided with the groove 105. The stopper member 101 is fitted in the groove 105 of the casing 60. In this structure, the stopper member 101 is inhibited from being displaced in the axial direction of the casing 60 by a surface portion of the casing 60 which faces the groove 105, and therefore suitably mounted while inhibiting axial displacement of the casing 60.

The casing 60 is provided with the concave portion 106, and the stopper member 101 is mounted with the protrusion 107 fitted in the concave portion 106. With the protrusion 107 fitted in the concave portion 106 of the casing 60, the protrusion 107 is inhibited from being displaced in the axial and circumferential directions of the casing 60. So, the stopper member 101 is suitably provided without displacement in the axial and circumferential directions.

In a case where the hydraulically powered system 22 is employed in a tilted ground, the plunger 61 and the sheet member 62 may sometimes move away from each other in the anti-reaction valve devices 21 and 22 due to a variation in the oil pressure during work. But in that case, the one-way valve means 65 inhibits flow of the hydraulic oil undesirably between the input and output pipes 26 and 27. Consequently, function of the hydraulic control unit and function of the hydraulically powered system can be maintained.

Figure 11:
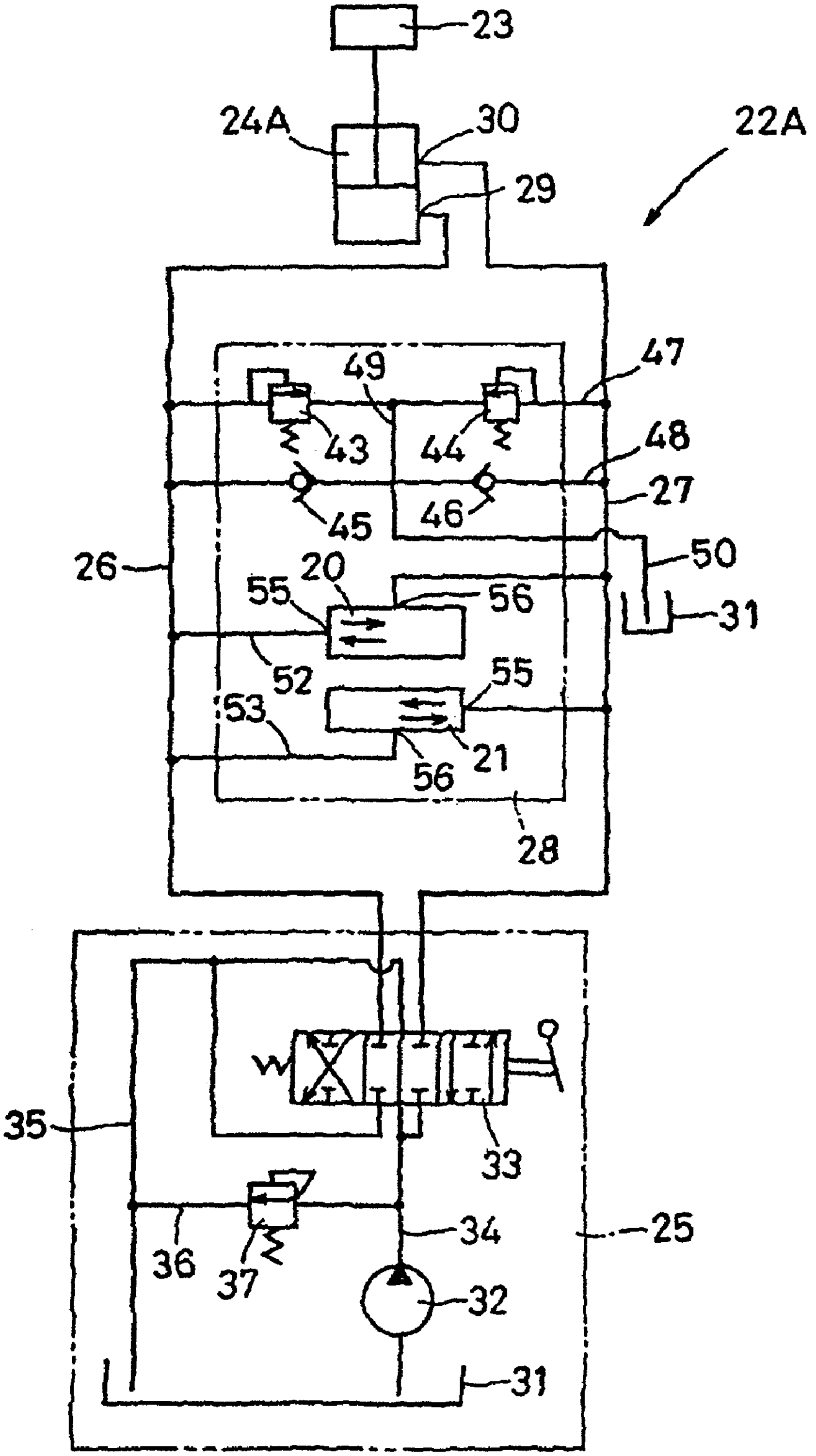
FIG. 11 is a view of a hydraulically powered system according to another embodiment of the present invention.
Figure 12:
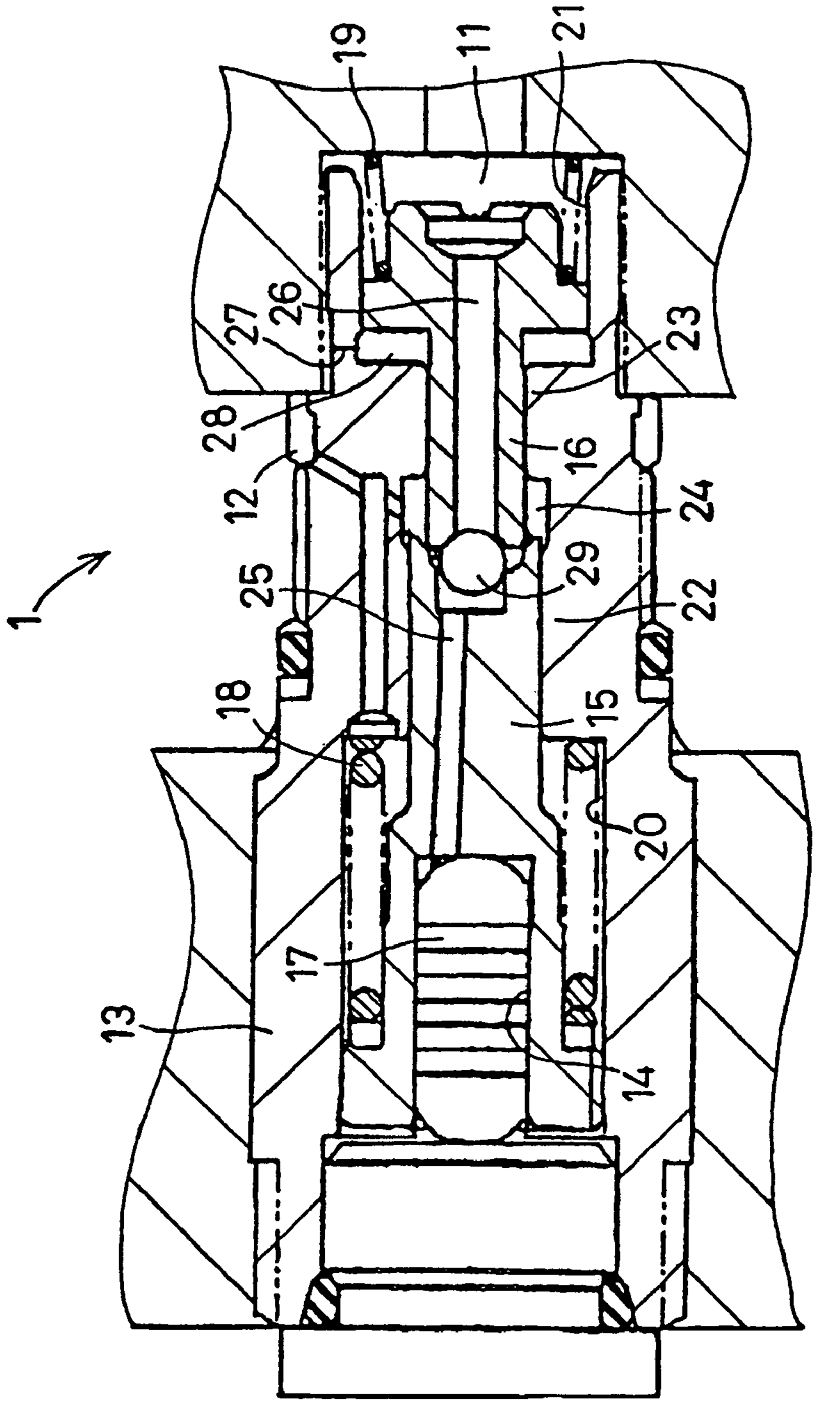
FIG. 12 Prior Art
FIG. 12 is a cross-sectional view of the conventional anti-reaction valve device.
Figure 13:
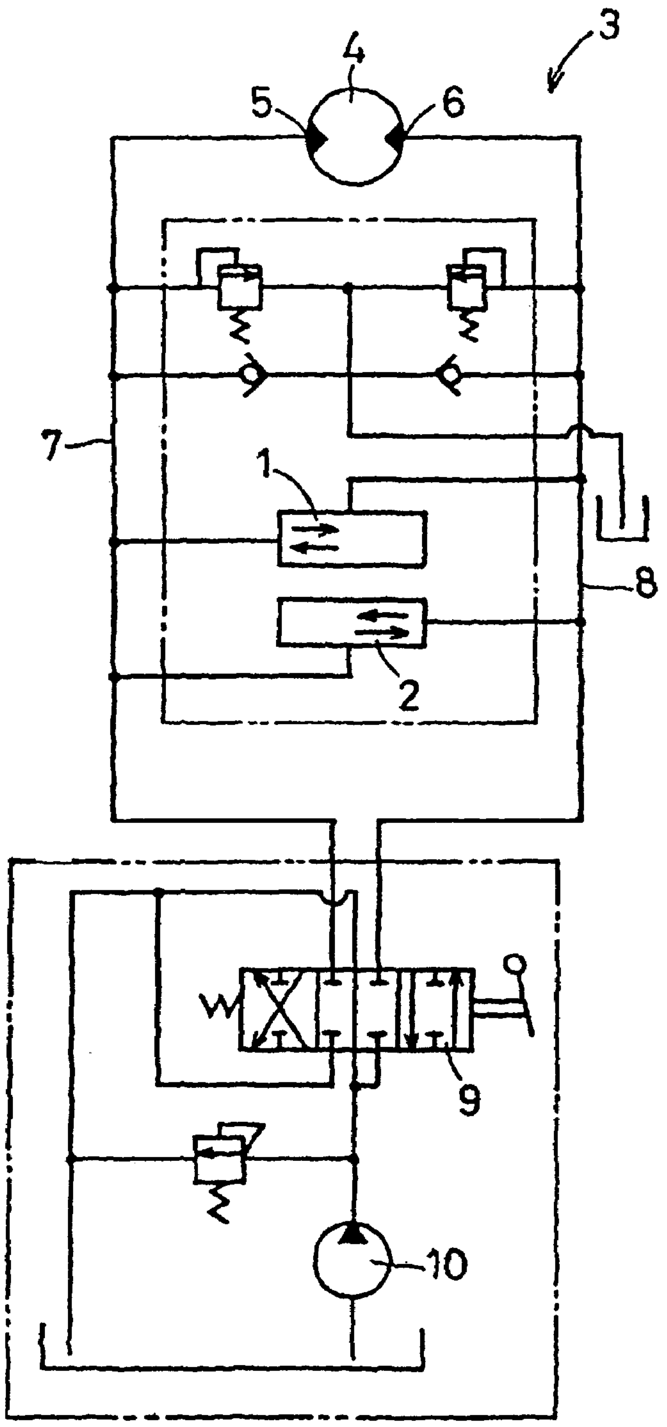
FIG. 13 Prior Art
FIG. 13 is a view of a hydraulically powered system equipped with anti-reaction valve devices.

FIG. 11 is a view of a hydraulically powered system 22A according to another embodiment of the present invention. Since the hydraulically powered system 22A of this embodiment is similar to the hydraulically powered system 22 of the embodiment shown in FIGS. 1 through 10, the same references are used to identify the same or the corresponding parts, which will not be further described. So, only different portions will be described. The hydraulically powered system 22A in FIG. 11 is provided with a double-action hydraulic cylinder 24A instead of the hydraulically powered motor 24. The double-action hydraulic cylinder 24A may be configured to cause the element 23 to reciprocate or to angularly displace. In the construction in which the hydraulically powered actuator uses the double-action hydraulic cylinder 24A, the same effects are provided.

The above described embodiments are exemplary and the constructions can be suitably altered within a scope of the present invention. For example, the embodiments may be practiced in systems which use hydraulic fluid other than the hydraulic oil or in systems mounted in construction machines and industrial machines. The embodiments may be employed in an environment in which the first difference pressure ΔP12 is higher than the first start open difference pressure PSHO, for example, in a system in which the bypass relief pressure Ps is set higher than the first open start difference pressure PSHO.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. An anti-reaction valve device comprising:

a casing provided with a primary port and a secondary port and a valve passage through which the primary and secondary ports fluidically communicate with each other;

a plunger slidably provided in the casing;

a sheet member slidably provided in the casing, the sheet member being movable to contact with the plunger to close the valve passage and being movable away from the plunger to open the valve passage;

a spring drive means configured to drive the plunger and the sheet member by exerting a spring force to the plunger and the sheet member in such a manner that, the plunger and the sheet member move away from each other when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and an open and close control chamber, and configured to inhibit a flow of the hydraulic fluid from the secondary port to the open and close control chamber.

2. An anti-reaction valve device comprising:

a casing provided with a primary port and a secondary port, and having two land portions which separate an interior of the casing to define a plunger chamber fluidically connected to the secondary port, a sheet member chamber fluidically connected to the primary port, and an open and close control chamber disposed between the plunger chamber and the sheet member chamber and configured to be fluidically connected to the secondary port;

a plunger fitted in the plunger chamber, and having one end portion sidably fitted to one of the two land portions which defines the plunger chamber and the open and close chamber so as to protrude into the open and close control chamber, the plunger having a cylinder bore which opens in the plunger chamber, and a plunger inner bore which opens in the cylinder bore;

a sheet member fitted in the sheet member chamber and slidably mounted on an inner surface portion of a portion of the casing which faces the sheet member chamber, the sheet member separating the sheet member chamber to define a port space fluidically connected to the primary port and a damping space fluidically connected to the primary port through a restricting hole, the sheet member having one end portion slidably fitted to an opposite land portion of the two land portions which defines the sheet member chamber and the open and close control chamber so as to protrude into the open and close control chamber, the sheet member having a valve bore which opens in the sheet member chamber, the sheet member being movable to contact with the plunger within the open and close control chamber to allow the valve bore and the plunger inner bore to be connected to each other to be fluidically disconnected from the open and close control chamber and being movable away from the plunger within the open and close control chamber to allow the valve bore and the plunger inner bore to be away from each other to be fluidically connected to the open and close control chamber;

a piston slidably fitted in the cylinder bore such that one end portion thereof protrudes into the cylinder bore; and a spring drive means having a first spring member configured to exert a spring force to the plunger to cause the plunger to move away from the sheet member and a second spring member configured to exert a spring force to the sheet member to cause the sheet member to move close to the plunger, the spring drive means being configured to drive the plunger and the sheet member in such a manner that, the plunger and the sheet member move away from each other when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and the open and close control chamber, and configured to inhibit a flow of the hydraulic fluid from the secondary port to the open and close control chamber.

3. A control valve unit equipped in a hydraulically powered system including a hydraulically powered actuator having two inlet and outlet ports; a supply means configured to supply a hydraulic fluid to the hydraulically powered actuator; and two input and output pipes configured to fluidically connect the inlet and outlet ports of the hydraulically powered actuator to the supply means, the control valve unit comprising:

two anti-reaction valve devices each including:

a casing provided with a primary port and a secondary port and a valve passage through which the primary and secondary ports fluidically communicate with each other;

a plunger slidably provided in the casing;

a sheet member slidably provided in the casing, the sheet member being movable to contact with the plunger to close the valve passage and being movable away from the plunger to open the valve passage;

a spring drive means configured to drive the plunger and the sheet member by exerting a spring force to the plunger and the sheet member in such a manner that, the plunger and the sheet member move away from each other when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and an open and close control chamber, and configured to inhibit a flow of the hydraulic fluid from the secondary port to the open and close control chamber, wherein directional relationship of connection of the primary port and the secondary port between the input and output pipes is reversed between the anti-reaction valve devices.

4. A control valve unit equipped in a hydraulically powered system including a hydraulically powered actuator having two inlet and outlet ports; a supply means configured to supply a hydraulic fluid to the hydraulically powered actuator; and two input and output pipes configured to fluidically connect the inlet and outlet ports of the hydraulically powered actuator to the supply means, the control valve unit comprising:

two anti-reaction valve devices each including:

a casing provided with a primary port and a secondary port, and having two land portions which separate an interior of the casing to define a plunger chamber fluidically connected to the secondary port, a sheet member chamber fluidically connected to the primary port, and an open and close control chamber disposed between the plunger chamber and the sheet member chamber and configured to be fluidically connected to the secondary port;

a plunger fitted in the plunger chamber, and having one end portion sidably fitted to the one of the two land portions which defines the plunger chamber and the open and close chamber so as to protrude into the open and close control chamber, the plunger having a cylinder bore which opens in the plunger chamber, and a plunger inner bore which opens in the cylinder bore;

a sheet member fitted in the sheet member chamber and slidably mounted on an inner surface portion of a portion of the casing which faces the sheet member chamber, the sheet member separating the sheet member chamber to define a port space fluidically connected to the primary port and a damping space fluidically connected to the primary port through a restricting hole, the sheet member having one end portion slidably fitted to an opposite land portion of the two land portions which defines the sheet member chamber and the open and close control chamber so as to protrude into the open and close control chamber, the sheet member having a valve bore which opens in the sheet member chamber, the sheet member being movable to contact with the plunger within the open and close control chamber to allow the valve bore and the plunger inner bore to be connected to each other to be fluidically disconnected from the open and close control chamber and being movable away from the plunger within the open and close control chamber to allow the valve bore and the plunger inner bore to be away from each other to be fluidically connected to the open and close control chamber;

a piston slidably fitted in the cylinder bore such that one end portion thereof protrudes into the cylinder bore; and a spring drive means having a first spring member configured to exert a spring force to the plunger to cause the plunger to move away from the sheet member and a second spring member configured to exert a spring force to the sheet member to cause the sheet member to move close to the plunger, the spring drive means being configured to drive the plunger and the sheet member in such a manner that, the plunger and the sheet member move away from each other when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and the open and close control chamber, and configured to inhibit a flow of the hydraulic fluid from the secondary port to the open and close control chamber, wherein directional relationship of connection of the primary port and the secondary port between the input and output pipes is reversed between the anti-reaction valve devices.

5. A hydraulically powered system comprising:

a hydraulically powered actuator provided with two inlet and outlet ports;

a supply means configured to supply a hydraulic fluid to the hydraulically powered actuator;

two input and output pipes configured to fluidically connect the inlet and outlet ports of the hydraulically powered actuator to the supply means; and two anti-reaction valve devices each including:

a casing provided with a primary port and a secondary port and a valve passage through which the primary and secondary ports fluidically communicate with each other;

a plunger slidably provided in the casing;

a sheet member slidably provided in the casing, the sheet member being movable to contact with the plunger to close the valve passage and being movable away from the plunger to open the valve passage;

a spring drive means configured to drive the plunger and the sheet member by exerting a spring force to the plunger and the sheet member in such a manner that, the plunger and the sheet member move away from each other when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and an open and close control chamber, and configured to inhibit a flow of the hydraulic fluid from the secondary port to the open and close control chamber, wherein directional relationship of connection of the primary port and the secondary port between the input and output pipes is reversed between the anti-reaction valve devices.

6. A hydraulically powered system comprising:

a hydraulically powered actuator provided with two inlet and outlet ports;

a supply means configured to supply a hydraulic fluid to the hydraulically powered actuator;

two input and output pipes configured to fluidically connect the inlet and outlet ports of the hydraulically powered actuator to the supply means; and two anti-reaction valve devices each including:

a casing provided with a primary port and a secondary port, and having two land portions which separate an interior of the casing to define a plunger chamber fluidically connected to the secondary port, a sheet member chamber fluidically connected to the primary port, and an open and close control chamber disposed between the plunger chamber and the sheet member chamber and configured to be fluidically connected to the secondary port;

a plunger fitted in the plunger chamber, and having one end portion sidably fitted to the one of the two land portions which defines the plunger chamber and the open and close chamber so as to protrude into the open and close control chamber, the plunger having a cylinder bore which opens in the plunger chamber, and a plunger inner bore which opens in the cylinder bore;

a sheet member fitted in the sheet member chamber and slidably mounted on an inner surface portion of a portion of the casing which faces the sheet member chamber, the sheet member separating the sheet member chamber to define a port space fluidically connected to the primary port and a damping space fluidically connected to the primary port through a restricting hole, the sheet member having one end portion slidably fitted to an opposite land portion of the two land portions which defines the sheet member chamber and the open and close control chamber so as to protrude into the open and close control chamber, the sheet member having a valve bore which opens in the sheet member chamber, the sheet member being movable to contact with the plunger within the open and close control chamber to allow the valve bore and the plunger inner bore to be connected to each other to be fluidically disconnected from the open and close control chamber and being movable away from the plunger within the open and close control chamber to allow the valve bore and the plunger inner bore to be away from each other to be fluidically connected to the open and close control chamber;

a piston slidably fitted in the cylinder bore such that one end portion thereof protrudes into the cylinder bore; and a spring drive means having a first spring member configured to exert a spring force to the plunger to cause the plunger to move away from the sheet member and a second spring member configured to exert a spring force to the sheet member to cause the sheet member to move close to the plunger, the spring drive means being configured to drive the plunger and the sheet member in such a manner that, the plunger and the sheet member move away from each other when a primary pressure of a hydraulic fluid on the primary port side is higher than a secondary pressure of a hydraulic fluid on the secondary port side, and a first difference pressure obtained by subtracting the secondary pressure from the primary pressure decreases from not lower than a first predetermined set difference pressure to not higher than a first open start difference pressure which is higher than the first set difference pressure at a speed not lower than a first predetermined reduction speed, and when the secondary pressure is higher than the primary pressure, and a second difference pressure obtained by subtracting the primary pressure from the secondary pressure decreases from not lower than a second predetermined set difference pressure which is lower than the first set difference pressure to not higher than a second open start difference pressure which is higher than the second set difference pressure at a speed not lower than a second predetermined reduction speed; and a one-way valve means provided between the secondary port and the open and close control chamber, and configured to inhibit a flow of the hydraulic fluid from the secondary port to the open and close control chamber, wherein directional relationship of connection of the primary port and the secondary port between the input and output pipes is reversed between the anti-reaction valve devices.

* * * * *

UNITED STATES PATENT AND TRADEMARK OFFICE

CERTIFICATE OF CORRECTION

PATENT NO. : 7,069,723 B2
APPLICATION NO. : 10/979889
DATED : July 4, 2006
INVENTOR(S) : Ryo Yamamoto et al.

It is certified that error appears in the above-identified patent and that said Letters Patent is hereby corrected as shown below:

At Column 25, line 53, "sidably" should be -- slidably --.

At Column 27, line 55, "sidably" should be -- slidably --.

At Column 29, line 58, "sidably" should be -- slidably --.

Signed and Sealed this

Second Day of February, 2010

David J. Kappos

*Director of the United States Patent and Trademark Office*